United States Patent
Flemma, Jr.

(10) Patent No.: US 12,314,977 B1
(45) Date of Patent: *May 27, 2025

(54) IDENTIFYING POTENTIALLY UNFAIR PRACTICES IN CONTENT AND SERVING RELEVANT ADVERTISEMENTS

(71) Applicant: Alberobello Capital Corporation, Charlotte, NC (US)

(72) Inventor: Robert J. Flemma, Jr., Charlotte, NC (US)

(73) Assignee: Alberobello Capital Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,302

(22) Filed: Nov. 14, 2023

Related U.S. Application Data

(63) Continuation of application No. 15/344,996, filed on Nov. 7, 2016, now Pat. No. 11,861,657, which is a continuation of application No. 14/104,715, filed on Dec. 12, 2013, now abandoned, which is a continuation of application No. 13/306,739, filed on Nov. 29, 2011, now Pat. No. 8,639,544.

(60) Provisional application No. 61/426,377, filed on Dec. 22, 2010.

(51) Int. Cl.
  *G06Q 30/0241* (2023.01)
  *G06Q 30/0251* (2023.01)

(52) U.S. Cl.
  CPC ..... *G06Q 30/0248* (2013.01); *G06Q 30/0269* (2013.01)

(58) Field of Classification Search
  None
  See application file for complete search history.

(56) References Cited

U.S. PATENT DOCUMENTS

| | | |
|---|---|---|
| 5,930,762 A | 7/1999 | Masch |
| 6,115,709 A | 9/2000 | Gilmour et al. |
| 6,920,464 B2 | 7/2005 | Fox |

(Continued)

FOREIGN PATENT DOCUMENTS

| | | | |
|---|---|---|---|
| WO | 0122261 A2 | 3/2001 | |
| WO | WO-2008076984 A1 * | 6/2008 | ............. G06Q 10/06 |
| WO | WO-2008088562 A2 * | 7/2008 | ............. G06Q 20/10 |

OTHER PUBLICATIONS

Naoki et al "Advertising and Risk Selection in Health Insurance Markets", Dec. 2015, Finance and Economics Discussion Series Division of Research & Statistics and Monetary Affairs Federal Reserve Board, Washington D.C. pp. 1-50 (Year: 2015).*

(Continued)

*Primary Examiner* — Romain Jeanty
(74) *Attorney, Agent, or Firm* — Myers Bigel, P.A.

(57) ABSTRACT

Identifying potentially unfair practices in content and serving relevant advertisements is described. A total risk score associated with an online advertisement is determined by a computer system based on a first risk score and an issue risk score. The first risk score is based on online content associated with the online advertisement and the issue risk score is based on one or more risk attributes associated with the online advertisement. The total risk score is transmitted to a client computer, where the total risk score is displayed through a user interface in conjunction with the display of the online advertisement on the client computer.

13 Claims, 15 Drawing Sheets

(56) References Cited

U.S. PATENT DOCUMENTS

| | | |
|---|---|---|
| 7,062,466 B2 | 6/2006 | Wagner et al. |
| 7,346,606 B2 | 3/2008 | Bharat |
| 7,360,166 B1 | 4/2008 | Krzanowski |
| 7,668,748 B1 | 2/2010 | Veach |
| 8,145,528 B2 | 3/2012 | Gilley et al. |
| 8,386,314 B2 | 2/2013 | Kirkby et al. |
| 8,423,406 B2 | 4/2013 | Briggs |
| 8,607,338 B2 | 12/2013 | Atcha |
| 8,614,997 B1 * | 12/2013 | Herder ................ H04W 40/026 |
| | | 370/338 |
| 8,930,239 B2 | 1/2015 | Ashbaugh |
| 2002/0072971 A1 | 6/2002 | Debusk et al. |
| 2004/0225562 A1 | 11/2004 | Turner |
| 2005/0086105 A1 * | 4/2005 | McFadden ......... G06Q 30/0244 |
| | | 705/14.43 |
| 2006/0031107 A1 | 2/2006 | Aihara et al. |
| 2006/0253425 A1 | 11/2006 | Borgs et al. |
| 2006/0253584 A1 | 11/2006 | Dixon et al. |
| 2006/0265493 A1 | 11/2006 | Brindley et al. |
| 2007/0022005 A1 | 1/2007 | Hanna |
| 2007/0129999 A1 | 6/2007 | Zhou et al. |
| 2008/0033810 A1 | 2/2008 | Chu |
| 2008/0052741 A1 | 2/2008 | Dharmaji |
| 2008/0097854 A1 | 4/2008 | Young |
| 2008/0154666 A1 | 6/2008 | Kuo et al. |
| 2008/0288481 A1 | 11/2008 | Zeng et al. |
| 2009/0030711 A1 | 1/2009 | Puccio et al. |
| 2009/0165128 A1 | 6/2009 | McNally et al. |
| 2009/0292608 A1 | 11/2009 | Polachek |
| 2009/0319420 A1 * | 12/2009 | Sanchez ................ G06Q 40/03 |
| | | 705/38 |
| 2010/0030638 A1 | 2/2010 | Davis, III et al. |
| 2010/0057528 A1 | 3/2010 | Pan |
| 2010/0106594 A1 | 4/2010 | Song et al. |
| 2010/0312608 A1 | 12/2010 | Shan et al. |
| 2011/0010370 A1 * | 1/2011 | Cosgrove ............. G06F 40/166 |
| | | 707/748 |
| 2011/0047006 A1 | 2/2011 | Attenberg et al. |
| 2011/0125548 A1 | 5/2011 | Aharon et al. |
| 2011/0173071 A1 | 7/2011 | Meyer et al. |
| 2011/0196735 A1 | 8/2011 | Von Sydow et al. |
| 2012/0023586 A1 | 1/2012 | Flickner et al. |
| 2012/0271709 A1 | 10/2012 | Ogawa |
| 2013/0191226 A1 * | 7/2013 | Smallwood ............ G06Q 30/02 |
| | | 705/14.68 |
| 2013/0197998 A1 * | 8/2013 | Buhrmann .............. H04M 1/27 |
| | | 726/3 |
| 2013/0275215 A1 | 10/2013 | Leblanc et al. |
| 2013/0282479 A1 | 10/2013 | Kuo et al. |
| 2013/0326554 A1 | 12/2013 | Shkedi |
| 2014/0006164 A1 | 1/2014 | Bellegante et al. |
| 2014/0074591 A1 | 3/2014 | Allen et al. |

OTHER PUBLICATIONS

"The Regulation of Unfair Practices in TV and Radio Advertisements", BCAP Consultation Document, 2008, 1-19.

Swindell, Bill, "Warren Outlines Sweeping New Approach to Consumer Financial Protection, Investigations Through Crowd-Sourcing, Wikis, and Heat-Mapping", NationalJournal.com, 2010.

* cited by examiner

*1200*

GET APPLICATION NOW!

① Setup your account

Please use a valid email address.    *1210*

Full Name *
E-mail *                    Retype E-mail *
Password *                  Retype Password*

The following are optional preferences to customize the way Adsterisk reviews ads and displays information:

Self estimate of Credit Rating   Select Employment Status ▼
Employment Status   Select Employment Status ▼
                                          *1220*

② Create your account

Please review and accept Adsterisk's Terms of use.

Please review and accept Adsterisk's Terms of use.

*1230*
☐ I accept terms of use.
*1240*
INSTALL APPLICATION

*FIG. 12*

IDENTIFYING POTENTIALLY UNFAIR PRACTICES IN CONTENT AND SERVING RELEVANT ADVERTISEMENTS

CROSS-REFERENCE TO RELATED APPLICATIONS

This application is a continuation of U.S. patent application Ser. No. 15/344,996, filed on Nov. 7, 2016, which is a continuation of U.S. patent application Ser. No. 14/104,714, filed on Dec. 12, 2013, which is a continuation of U.S. patent application Ser. No. 13/306,739, filed on Nov. 29, 2011, and entitled "IDENTIFYING POTENTIALLY UNFAIR PRACTICES IN CONTENT AND SERVING RELEVANT ADVERTISEMENTS," which claims the benefit of U.S. Provisional Application No. 61/426,377, filed Dec. 22, 2010, the entire contents of each being hereby incorporated herein by reference.

BACKGROUND

Today, people are spending more time browsing websites and searching online content available over computer networks such as the Internet. In doing so, they are exposed to an increasing number of online advertisements ("ads"), many targeted to them based on their user profiles or online behavior. Not surprisingly, the ads they see often appear to offer the "perfect" product or service. Most ads contain claims about the cost, benefits, safety, effectiveness or other attributes of the advertised product or service. Sometimes these claims are false, misleading, or unsubstantiated. For example, an ad for weight loss or diet pills may state or imply that a person who takes the pills will lose large amounts of weight in a short period of time. These claims are often accompanied by customer testimonials and "before" and "after" pictures depicting dramatic weight loss. Even if the testimonials or pictures are from actual customers, they may not reflect typical results and the ad may not contain the appropriate reminder that the portrayed results are not typical and that actual results may vary. These ads may also include statements that the weight loss pills are "clinically proven" to work and are "safe" to use—when in fact there is little or no empirical evidence to support such claims.

Some ads bury important terms and conditions several layers or links deep within online content, in an attempt to hide limitations or restrictions on claims made prominently elsewhere. Sometimes these limitations are presented in font sizes and colors that are difficult to see. Still other ads present important terms and conditions behind links which are not readily identifiable as links, by using a color or formatting style that is different than other links on a web page, for example.

Some advertisers attempt to portray themselves as reputable research institutions or consumer protection advocates that conduct research into safety and effectiveness of products or services and use official-sounding names, to create a favorable impression upon users. These ads often claim that other ads are misleading and purport to "expose" or "unmask" false claims made in competitors' ads.

These advertising techniques make it especially difficult for users to evaluate the true costs, benefits, safety, effectiveness, or other attributes of the advertised product or service. In the present rapidly changing online environment, users have relatively few objective tools to help them evaluate ads before making a purchase. Thus, it is increasingly more difficult for them to distinguish between ads that fairly present a product or service and ads that contain false or misleading claims.

At the same time, many online advertisers have found that this online environment has removed barriers for unscrupulous marketers who use sharp online sales practices to sell products or services on terms which are, in fact, too good to be true. With a widening spectrum between "good" and "bad" online marketing practices, consumer satisfaction may deteriorate and reputable firms may find it harder to compete.

What is needed is a system and method to aid consumers in distinguishing between fair and unfair marketing practices thereby helping them make better online purchasing decisions.

SUMMARY

In one embodiment, a method for identifying potentially unfair practices in content is described, including determining, by a computer, whether content includes at least one advertisement, if the content is determined to contain an advertisement, determining, by the computer, a product or service associated with the advertisement, assigning, by the computer, a product risk score to the product or service, analyzing, by the computer, the advertisement for at least one issue item associated with the advertisement and, if the advertisement includes an issue item, assigning an issue risk score based on the analyzing, combining, by the computer, the product risk score and the issue risk score to produce an overall risk analysis, and transmitting an instruction to display an indicator of the overall risk analysis to highlight potentially unfair practices.

In one aspect, the method for identifying potentially unfair practices further includes assigning, by the computer, a product code to the determined product or service, and assigning, by the computer, an issue code based on the analyzing, if the advertisement includes an issue item. In other aspects, the method further includes adjusting, by the computer, the issue risk score based on adjustment factors identified in the content, user-specific information, and third party data, and matching, by the computer, the advertisement to one or more comments stored in a comments database based on one or a combination of at least two of the product code, the product risk score, the issue code, the adjusted issue risk score, the user-specific information, and the third party data.

In another aspect, the method for identifying potentially unfair practices includes analyzing, by the computer, the content to identify indicia of advertisements, assigning, by the computer, points for each identified indicia of advertisement, summing, by the computer, the points assigned for each identified indicia of advertisement, comparing, by the computer, the sum of points to a points threshold, and determining, by the computer, that an advertisement is present in the content when the sum of points is equal to or greater than the points threshold and that an advertisement is not present in the content when the sum of points is less than the points threshold. The method for identifying potentially unfair practices may further include searching, by the computer, the content to identify products or services associated with the advertisement and assigning a product code to each identified product or service. For each assigned unique product code, determining whether content includes at least one advertisement and assigning a product risk score may further include tallying a number of instances the unique product code was assigned, to produce a product code tally for the unique product code, and comparing a percentage proportion of the product code tally to a product threshold. Determining whether content includes at least one advertisement and assigning a product risk score may further include determining, by the computer, a product type or service associated with the advertisement for each product code tally that equals or exceeds the product threshold.

In still another aspect, analyzing the advertisement for at least one issue item includes analyzing, by the computer, the advertisement for general advertising issues associated with advertisements for products or services generally and, if the advertisement includes one or more general advertising issues, assigning a general issue code and a general issue risk score to each identified general advertising issue. Analyzing the advertisement for at least one issue item may further include analyzing, by the computer, the advertisement for specific advertising issues based on the product code, user-specific information, and third party data and, if the advertisement includes one or more specific advertising issues, assigning a specific issue code and specific issue risk score to each identified specific advertising issue.

The method for identifying potentially unfair practices includes identifying, by the computer, one or more relevant advertisements based on one or a combination of at least two of the product code, the product risk score, the issue code, the issue risk score, user-specific information, and third party data. The method for identifying potentially unfair practices may further include transmitting an instruction to display the one or more relevant advertisements.

In another embodiment, a method for identifying potentially unfair practices in content is described, including determining, by a computer, a product or service associated with an advertisement within content and assigning a product code to the determined product or service, assigning, by the computer, a product risk score to the product or service and modifying the product risk score based on any available user-specific information, analyzing, by the computer, the advertisement for at least one issue item associated with the advertisement and, if the advertisement includes an issue item, assigning an issue risk score based on the analyzing, and identifying, by the computer, one or more relevant advertisements stored in an advertisement database based on one or a combination of at least two of the product code, the product risk score, the issue risk score, and the user-specific information.

In one aspect, the method for identifying potentially unfair practices includes assigning, by the computer, an issue code based on the analyzing, if the advertisement includes an issue item, and adjusting, by the computer, the issue risk score based on adjustment factors identified in the content, the user-specific information, and third party data, where the identifying one or more relevant advertisements includes identifying the one or more relevant advertisements based further on the issue code and the adjusted issue risk score.

In another aspect, the method for identifying potentially unfair practices includes transmitting an instruction to display the one or more relevant advertisements, and in response to a user-request, transmitting an instruction to display an analysis of the one or more relevant advertisements. The method for identifying potentially unfair practices may include analyzing, by the computer, the one or more relevant advertisements to generate the analysis of the one of more relevant advertisements based at least in part on the user-specific information.

In still another aspect, the method for identifying potentially unfair practices includes converting, by the computer, a format of one or more of the product code, the product risk score, the issue risk score, and the user-specific information into a tag or other format used by a third party for classifying, identifying, or serving advertisements. The identifying one or more relevant advertisements may include identifying the one or more relevant advertisements based on the converted format, and the advertisement database may include a database of a third party.

In still another embodiment, an apparatus for identifying potentially unfair practices in content is described, including a comment database that stores comments associated with products and services, an advertisement database that stores advertisements, and a processor that implements a rule engine, the rule engine being configured to determine a product or service associated with an advertisement and assign a product code to the determined product or service, analyze the advertisement for at least one issue item associated with the advertisement and assign an issue code and an issue risk score based on the analysis and any available user-specific information, and identify relevant advertisements stored in the advertisement database and comments stored in the comment database based on one or a combination of at least two of the product code, the issue code, the issue risk score, and the user-specific information.

In one aspect, the rule engine is further configured to analyze content to identify indicia of advertisements, assign points for each identified indicia of advertisement, sum the points assigned for each identified indicia of advertisement, compare the sum of points to a points threshold, and determine that an advertisement is present in the content when the sum of points is equal to or greater than the points threshold and that an advertisement is not present in the content when the sum of points is less than the points threshold. The rule engine may be further configured to analyze the advertisement for general advertising issues associated with advertisements for products or services generally and, if the advertisement includes one or more general advertising issues, assign a general issue code and general issue risk score to each identified general advertising issue, and analyze the advertisement for specific advertising issues based on the product code, the user-specific information, and third party data and, if the advertisement includes one or more specific advertising issues, assign a specific issue code and specific issue risk score to each identified specific advertising issue.

In another aspect, the rule engine may be further configured to analyze the relevant advertisements and transmit an instruction to display an analysis of the relevant advertisements for display. The analysis of the relevant advertisements may be based at least in part on the user-specific information.

In still another embodiment, a method for serving relevant advertisements is described, including receiving, from a computer, a search request including one or more words or phrases, identifying, by the computer, one or more relevant advertisements stored in an advertisement database based on the one or more words or phrases and any available user-specific information, transmitting, by the computer, an instruction to display the identified relevant advertisements, and analyzing, by the computer, one of the identified relevant advertisements for at least one issue item and, if the one of the identified relevant advertisements includes an issue item, assigning an issue risk score based on the analyzing.

BRIEF DESCRIPTION OF THE DRAWINGS

For a more complete understanding of the invention and the advantages thereof, reference is now made to the following description, in conjunction with the accompanying figures briefly described as follows:

FIG. 12 illustrates an example user interface for creating a user account and configuring user preferences;

DETAILED DESCRIPTION

Figure 1:
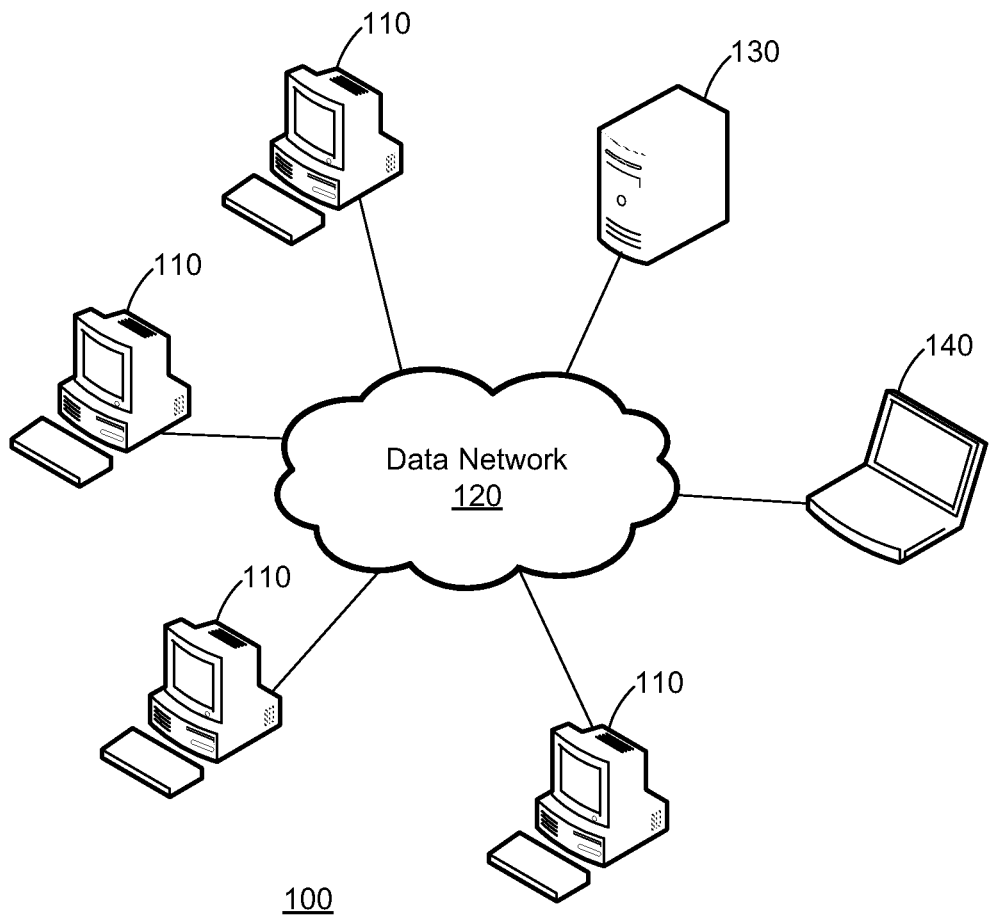
FIG. 1 illustrates an example network diagram.

In the following paragraphs, the present invention will be described in further detail by way of example with reference to the attached drawings. In the description, well known components, methods and/or processing techniques are omitted or described briefly so as not to obscure the invention. As used herein, the "present invention" refers to any one of the embodiments of the invention described herein, and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions.

Among embodiments, the present invention includes an application that helps consumers analyze online ads to make better purchasing decisions. According to aspects of the present invention, a rule engine analyzes ad content and other information provided by the user and/or third parties to identify ads with "hidden traps" or that employ potentially unfair or deceptive marketing practices. Based on the analysis and evaluation of such data, the present invention provides users with in-session comments about ads they are viewing and can suggest ads for products and services that may meet their specific needs.

In one embodiment, the present invention is implemented for use on a personal computer or other web-enabled device, while a user of the device views online content received over the Internet or similar network services. For example, the online content may be displayed on a web browser such as Microsoft Internet Explorer® or Mozilla Firefox®.

Based on the online content displayed on the web browser, a rule engine of the present invention is configured to search for, analyze, and evaluate ads. The rule engine may parse through a webpage or other electronically published document such as a Hyper Text Markup Language (HTML) document, an HTML5 document, an Extensible Markup Language (XML) document, or any other well known publishing markup language or format, to identify ads. Additionally, the rule engine may parse through other file formats such as portable document format (pdf) files and executable scripts such as Adobe Flash® and JavaScript®, among others. Generally, the rule engine may parse though any type of webpage content. After identifying one or more ads, the rule engine is further configured to identify a host of potentially unfair or deceptive marketing practices. Additional aspects permit the user to launch an expanded display box that includes comments and other helpful information provided by the rule engine. In the expanded display box, important information that the rule engine identified deep within the ad may be enlarged and redisplayed for easy viewing and analysis. Additionally, the present invention allows users to receive, display, and analyze relevant advertisements and offers for products and services. The relevant ads may be served from a stored inventory or by third parties.

Aspects of the present invention also include providing tailored risk feedback, risk ratings, and relevant ads based on information provided by a specific user and/or a third party.

User specific data may also be used by advertisers to serve tailored ads for relevant products or services. The present invention may also be used by advertisers to satisfy product suitability standards imposed by law, regulation, or industry practice.

Turning now to the drawings, in which like numerals indicate like elements throughout, exemplary embodiments of the present invention are described in detail.

FIG. 1 illustrates an example network diagram associated with aspects of the present invention. FIG. 1 illustrates a plurality of client computers 110, a data network 120, a server 130, and an administrator computer 140. The client computers 110 may include personal computers, laptops, tablet computers, mobile phones, or any other electronic devices. The data network 120 may include any computer network well known in the art such as a Local Area Network (LAN), a Wide Area Network (WAN), or the Internet. Further, the data network 120 may include a combination of different types of networks such as wired, wireless, optical, and cellular networks. Each of the computers 110, 130, and 140 are communicatively connected via the data network 120, and the client computers 110 may access files and data stored upon the server 130 via the data network 120. Likewise, the administrator computer 140 may access files and data stored on the server 130 via the data network 120. It is noted that FIG. 1 is provided as a representative example network configuration only, and the present invention may be practiced using various other configurations as would be understood by one having ordinary skill in the art.

Among embodiments, the server 130 may execute applications, serve as a network host for electronically distributed documents and other media in HTML, HTML5, or other formats, provide data and programs for download, and store data associated with aspects of the present invention. The client computers 110 and the administrator computer 140 may display electronically distributed documents hosted by the server 130 and download data including programs from the server via the data network 120. Application or program data downloaded by the computers 110 and 140 may be installed at the computers 110 and 140 for execution at the computers 110 and 140. Functionally, the administrator computer 140 is the same as any one of the client computers 110. In FIG. 1, the administrator computer 140 is simply representative of a computer which is operated by an administrator of the server 130. The administrator may have additional access rights to the hardware, software, and data of the server 130 for configuration of various aspects of the present invention, as described below.

Figure 2:
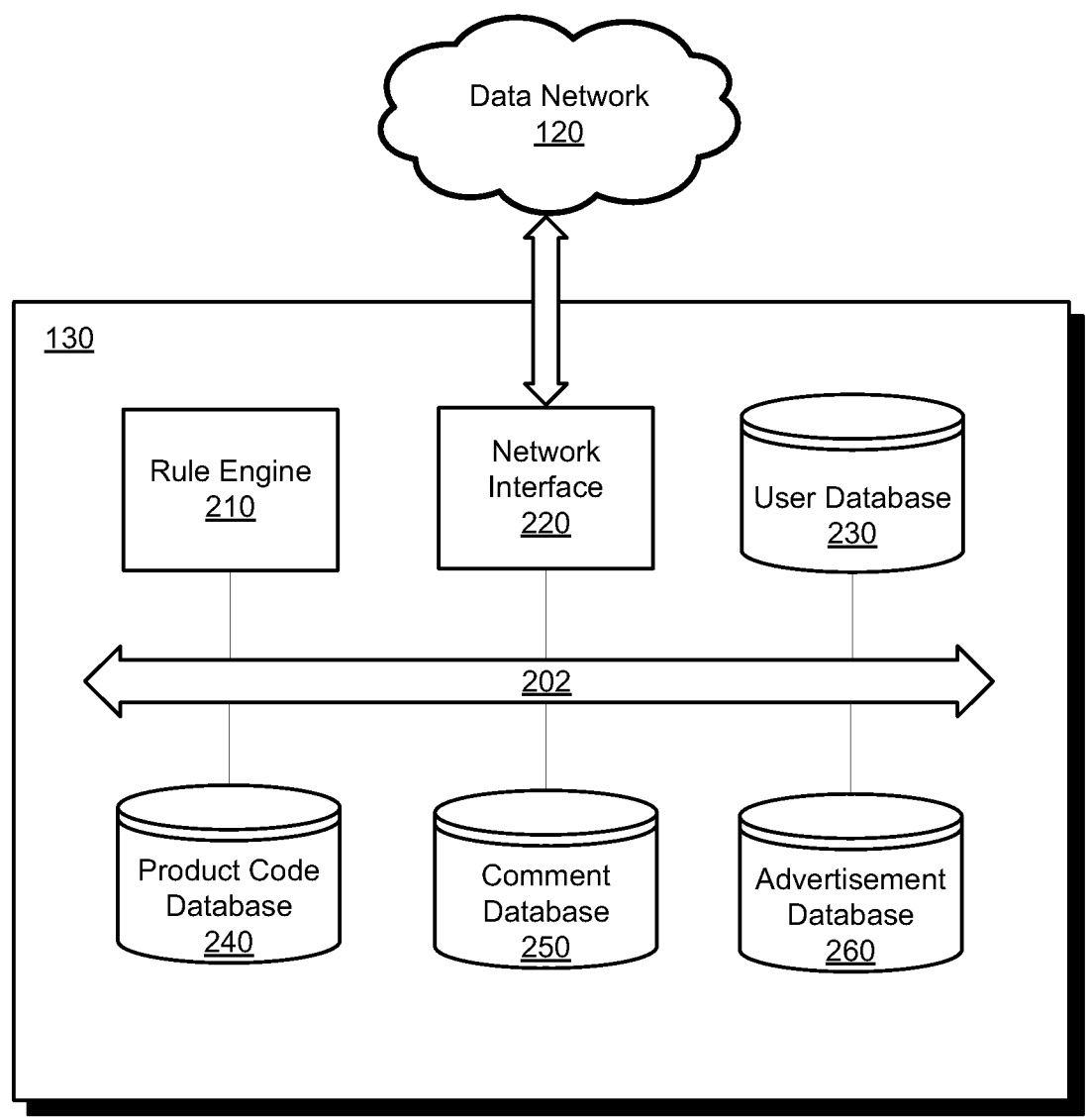
FIG. 2 illustrates an example functional block diagram according to an embodiment.

FIG. 2 illustrates an example functional block diagram illustrating functional blocks of the server 130. The functional blocks illustrated in FIG. 2 represent data storage, program execution, and various other hardware and software aspects of the server 130. The server 130 includes a rule engine 210, a network interface 220, a user database 230, a product code database 240, a comment database 250, and an advertisement database 260. A bus 202 communicatively couples the elements of the server 130.

The network interface 220 communicates data to and from the server 130 and the data network 120 and permits the other elements 210, 230, 240, 250, and 260 of the server 130 to communicate data over the data network 120. The network interface 220 may comprise a network controller including electronic circuitry and associated software that communicates using any well known physical, data, and transport layer protocol standard such as PPP, Ethernet, OTN, 802.11, 802.16, Token Ring, and TCP/IP. Thus, the client computers 110 and the administrator computer 140 may access data and files stored on the server 130 over the data network 120 using the network interface 220.

The user database 230 includes data associated with users registered by the server 130. The data associated with the users may include, but is not limited to, names, usernames, passwords, postal addresses, e-mail addresses, and IP addresses, for example. The user database 230 also includes user-specific information provided by the users, examples of which include, but are not limited to, a specific user's age, credit history or credit rating, annual income, education level, and employment status. The user database 230 may be stored in one or more storage devices of the server 130, or the user database 230 may be completely or partially stored in one or more storage devices at a location apart from the server 130.

The product code database 240 includes information associated with various products and services, along with product and service codes that identify various products and services. For example, a "CC" product code may be associated with a credit card, and a "WLP" product code may be associated with a weight loss product. Product codes may be further refined to identify various subcategories or subtypes of products or services within a particular category or type. For example, a credit card with an adjustable annual percentage rate may be identified with the product code "CCAdjAPR." Product codes can also be further refined based on user specific data from the user database 230. For example, if a user's address or geolocation is available and he is searching for a store that sells weight loss pills, the product code WLP may be further defined as WLP[n], where "n" is associated with the user's Zip Code or geolocation coordinates. Associations between user specific data and product code or issue codes, as further described below, may occur at any stage of the processes described below. As generally described herein, product codes are relied upon by the rule engine 210 to maintain associations between products or services and tallies of risk points associated with the products or services. Product codes may also be used alone or in combination with risk scores and user specific data to tailor relevant ads displayed to the user, as described in further detail below. It should be appreciated overall that the product, service, issue, or claim "codes" described herein are generally relied upon for simplicity of discussion, and the rule engine 210 may rely upon any suitable means or method to maintain associations between products, services, issues, claim codes, risk points, user specific data, and third party data. In other words, the present invention is not intended to be limited to the use of any particular product, service, issue, claim code, risk point, user specific data, or third party data described herein.

The comment database 250 includes comments associated with products and services, and each of the comments may be associated with one or more of the product, service, issue, claim codes stored in the product code database 240 and any other data associated with the codes, such as, for example, risk point combinations, user specific data, or data obtained from third parties. For example, the comment database 250 may include comments related to one or more credit cards associated with the CC product code. Additionally, the comment database 250 may include comments related to one or more weight loss products associated with the WLP product code. Both the product code and comment databases 240 and 250 may be stored in one or more storage devices of the server 130 or completely or partially stored in one or more storage devices at a location apart from the server 130.

Among various aspects of the rule engine 210 described in further detail below, the rule engine 210 is configured to determine whether online content includes an ad, determine a product or service associated with the ad, analyze the ad to identify issue items associated with the ad, and display an indicator of an overall risk associated with the ad. In this manner, the rule engine 210 is able to highlight potentially unfair advertising practices. Additional aspects and features of the rule engine 210 are described in further detail below with reference to FIGS. 5-11.

Figure 3:
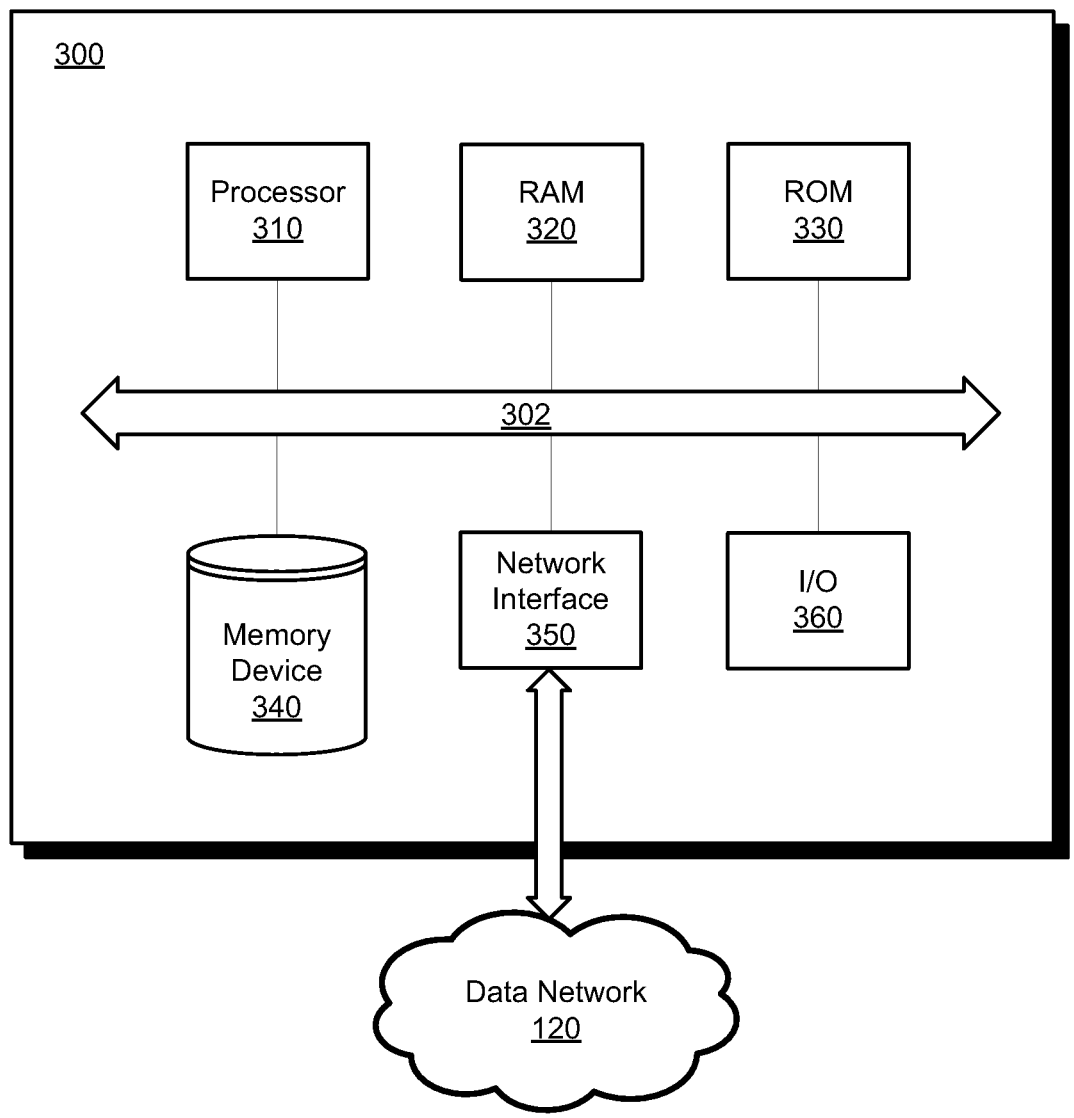
FIG. 3 illustrates an example hardware diagram.

FIG. 3 illustrates an example hardware diagram of a general purpose computer 300. Any of the client computers 110, the server 130, and the administrator computer 140 may be implemented using elements of the general purpose computer 300. The computer 300 includes a processor 310, a Random Access Memory (RAM) 320, a Read Only Memory (ROM) 330, a memory device 340, a network interface 350, and an Input Output (I/O) interface 360. The elements of the computer 300 are communicatively coupled via a bus 302.

The processor 310 comprises any well known general purpose arithmetic processor. Both the RAM 320 and the ROM 330 comprise well known random access and read only memory devices, respectively, that store computer-readable instructions to be executed by the processor 310. The memory device 340 stores computer-readable instructions thereon that, when executed by the processor 310, direct the processor 310 to execute various aspects of the present invention described herein. As a non-limiting example group, the memory device 340 may comprise one or more of an optical disc, a magnetic disc, a semiconductor memory (i.e., a flash based memory), a magnetic tape memory, a removable memory, combinations thereof, or any other well known memory means for storing computer-readable instructions. The I/O interface 360 comprises device input and output interfaces such as keyboard, pointing device, display, communication, and other interfaces. The bus 302 electrically and communicatively couples the processor 310, the RAM 320, the ROM 330, the memory device 340, the network interface 350, and the I/O interface 360, so that data and instructions may be communicated among the processor 310, the RAM 320, the ROM 330, the memory device 340, the network interface 350, and the I/O interface 360. In operation, the processor 310 is configured to retrieve computer-readable instructions stored on the memory device 340, the ROM 330, or another storage means, and copy the computer-readable instructions to the RAM 320 for execution. The processor 310 is further configured to execute the computer-readable instructions to implement various aspects and features of the present invention described herein. For example, the processor 310 may be adapted and configured to execute the processes described below with reference to FIGS. 4-11, including the processes described as being performed by the rule engine 210. Also, the memory device 340 may store the databases 230, 240, 250, and 260 illustrated in FIG. 2 alone or in combination with other memory devices.

Before turning to the process flow diagrams of FIGS. 4-11, it is noted that the present invention may be practiced using an alternative order of the processes and steps illustrated in FIGS. 4-11. That is, the process flows illustrated in FIGS. 4-11 are provided as examples only, and the present invention may be practiced using process flows that differ from those illustrated. Additionally, it is noted that not all steps are required in every embodiment. In other words, one or more of the steps may be omitted or replaced, without departing from the spirit and scope of the invention.

Figure 4:
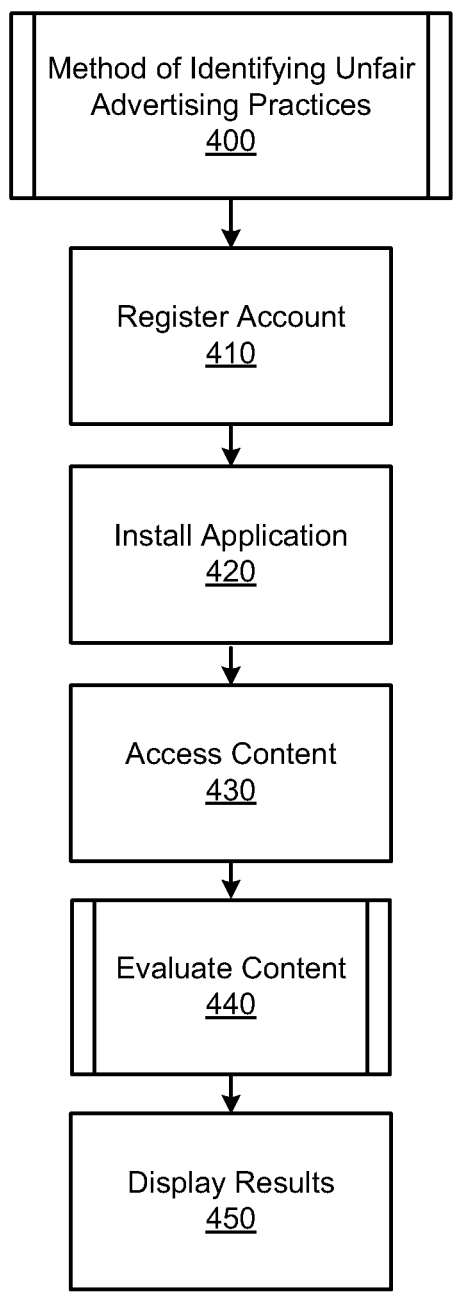
FIG. 4 illustrates an example process flow diagram for a method of identifying unfair advertising practices.

FIG. 4 illustrates an example process flow diagram associated with a method 400 of identifying unfair advertising practices. The method 400 includes, registering a user account at 410, installing an application at 420, accessing online content at 430, evaluating the online content at 440, and displaying results at 450.

More particularly, at step 410 one of the client computers 110 may download and install a program or executable application from the server 130. Among embodiments, the application program may include a stand-alone executable program, a toolbar of a web browser, a plug-in of a web browser, or a toolbar or plug-in of an e-mail application, for example.

With reference to FIG. 12, step 410 may include one of the client computers 110 navigating to a website hosted by the server 130 using a Uniform Resource Locator ("URL") (i.e., www address). FIG. 12 illustrates an example web page 1200 hosted by the server 130. A user of the client computer 110 may navigate to the web page 1200 to download an application associated with features and aspects of the present invention. Before or after downloading the application, the web page 1200 may request that a user provide setup and account information including a name, an email address, password, and/or other data that allows the server to recognize a specific user and/or device. Additionally, before or after permitting a user to download application software, the server 130 may offer the user an opportunity to provide user-specific information. The user-specific information may be used by certain aspects of the present invention as described below. Step 420 of FIG. 4 is representative of a user providing setup, account, and user-specific information based on entry fields of the web page 1200. As entry fields for the account, setup, and user-specific information, the web page 1200 may include one or more text entry fields 1210 and one or more pull-down menus 1220. Using the text entry fields 1210, a user may enter name, e-mail, and password information. Using the pull-down menus 1220, the user may provide user-specific information such as a self-estimate of credit rating and employment status. The text entry fields 1210 and pull-down menus 1220 are provided as a non-exhaustive set of example entry fields, and additional or alternative fields or menus for entry of setup, account, and other user-specific information may be provided on the web page 1200. Based on the setup, account, and user-specific information provided by the user, the server 130 may register a new user account and store the new user account in the user database 230.

In association with providing a download of application software, the web page 1200 may also display terms and conditions for use of the application software. Before permitting the download, the web page 1200 may require that the user accept the terms using a checkbox or radio button 1230. After accepting the terms of use, the user may initiate download of the application software by clicking an installation button 1240. Once the application software is downloaded to the client computer 110, the application software may be installed at the client computer 110 for execution.

Referring again to FIG. 4, after the application software is installed and executing on the client computer 110, a user of the client computer 110 may access online content available to the user via the data network 120 at step 430. Because the data network 120 includes or is connected to the Internet, a user of the client computer 110 is able to display online content by directing a web browser of the client computer 110 to one or more web pages or other content available on the Internet. That is, the online content may be displayed on a monitor or other display of the client computer 110 within a web browser executing on the client computer 110.

In association with the display, the online content may be evaluated by the rule engine 210 of the server 130, to assess risk associated with ads within the online content. Alternatively or additionally, portions of the evaluation may occur on the client computer 110 as described in more detail with reference to FIG. 6 below. The process of evaluating content at 440 is as described in further detail below. While the evaluation of content is primarily described with respect to content accessed over the Internet, it is noted that content accessed over a private network may also be evaluated, as long as the server 130 has access to the private network. At step 450, the results of the evaluation are displayed on the client computer 110. The results of the evaluation may include an overall risk rating related to ads identified within the online content, displayed as a series of asterisks or other metric. Further, the results may include comments related to ads identified within the online content, and the comments may be tailored to specific issues associated with certain products or services and for particular users. Additionally, the results may include enlarged or highlighted text or copy from portions of ads, as well as ads for relevant products and services.

Figure 5:
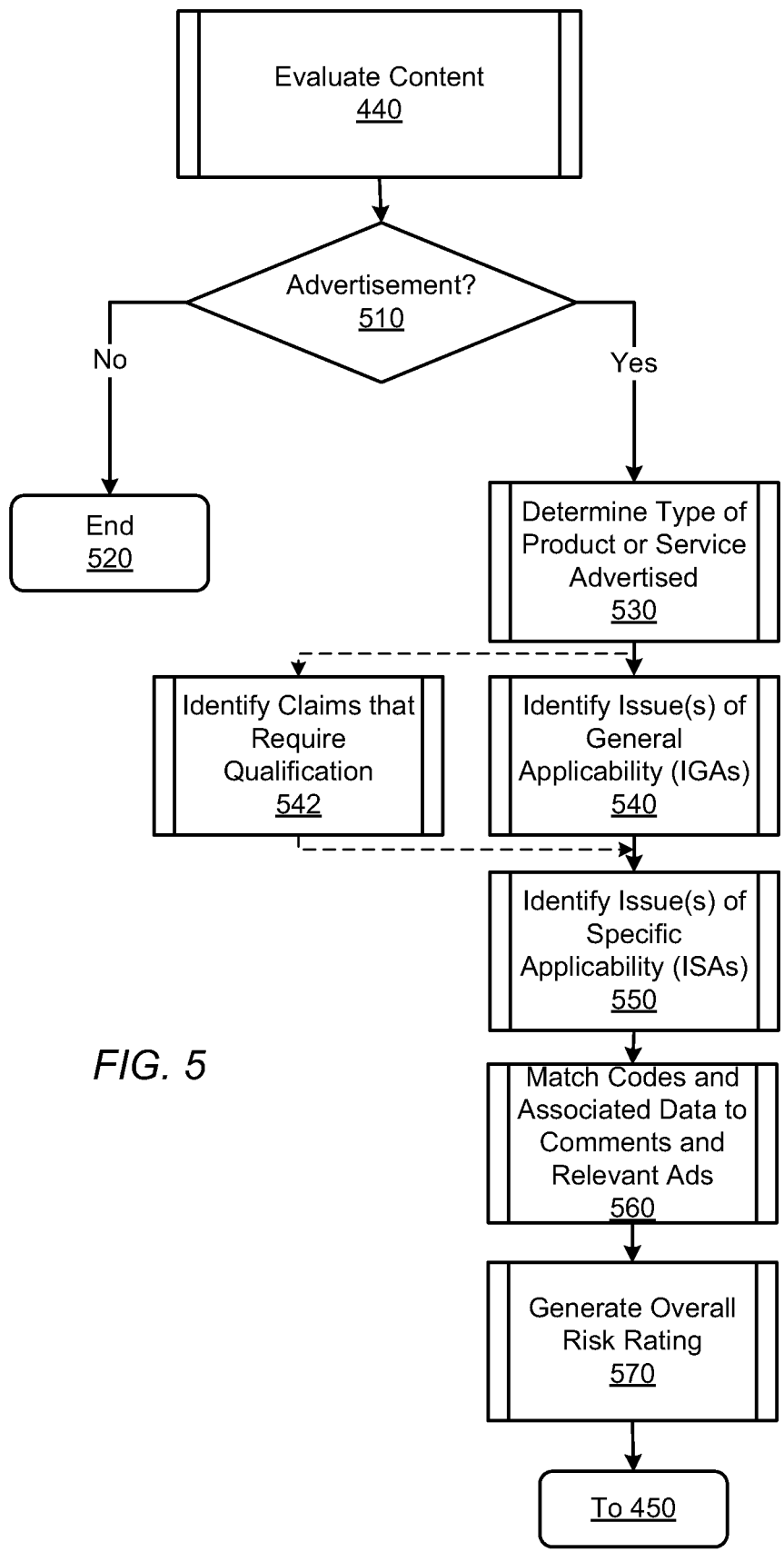
FIG. 5 illustrates an example process flow diagram for evaluating content.

Turning to FIG. 5, an example of the process of evaluating content is described in further detail. According to FIG. 5, evaluating content includes a process of determining whether ads exist within online content at 510, a process of determining a type of product or service advertised in the ads at 530, a process of identifying issues of general applicability at 540, a process of identifying issues of specific applicability at 550, a process of matching codes and other data that may be associated with them to comments and relevant ads at 560, and a process of generating an overall risk rating at 570. Alternatively or additionally to the process of identifying issues of general applicability at 540, the process of evaluating content may include a process of identifying claims that require qualification at 542.

At 510, the rule engine 210 determines whether online content includes an ad. To begin, the application installed on the client computer 110 at step 410 may transmit a link or other indicator to the server 130, so that the server 130 is able to identify online content currently being displayed at the client computer 110. In other words, after a user of the client computer 110 has navigated to online content using a URL, the application may transmit the URL to the server 130, so that the rule engine 210 of the server 130 may retrieve and evaluate the online content. That is, using the URL, the rule engine 210 may retrieve (via the data network 120) a copy of the online content currently being displayed by the client computer 110 and identify and evaluate ads within the online content. In some embodiments, data extracted from online content associated with URLs (and perhaps the online content itself) and/or evaluation results may be classified, cached, and stored on the server 130 and/or a local drive on the client computer 110. Cached data, content, or evaluation results may be parsed by the rule engine 210 or the client computer 110 to determine if content associated with the URL was previously analyzed and rated. If so, the cached information may be relied upon by the rule engine 210 to save processing time and network bandwidth. The cached information may also be used to perform analysis and return results to the user. Because some cached information may be generated, in part, based on user-specific information, the cached information may only be re-usable to the extent it was generated without reference to user-specific information, or was generated based on user-specific information that is the same as or similar to user-specific information associated with a present user request. A more detailed description of the identification of ads at 510 is provided below with reference to FIG. 6.

If no ad is identified within the online content at 510, the evaluation of content ends at step 520 without further evaluation or processing. If an ad is identified within the online content at 510, however, the rule engine 210 proceeds to the process of determining a type of product or service associated with the ad at 530. For example, various types of products or services associated with identified ads, such as credit cards, banking products, mortgages, dating services, consumables, and weight loss products, may be determined. It is noted that, although the processes of the present invention are described with reference to a set of products and services, it should be appreciated that the present invention may be used to identify and evaluate ads for any type of product or service. The product code database 240 includes a list of products and services along with product and service codes that identify the respective products and services for reference by the rule engine 210, as described above. Determining types of products or services by the rule engine 210 is described in additional detail below with reference to FIG. 7.

At 540, issues of general applicability (IGAs) may be identified. IGAs are issues that apply to advertisements generally, such as hidden disclaimers and unfavorable presentation of terms or conditions, for example. The process of identifying IGAs in advertisements at 540 is described in additional detail below with reference to FIG. 8A. Alternatively or additionally, claims that require qualification may be identified in online advertisements at 542. That is, at 542, the rule engine 210 may analyze ads for claims such as "Risk Free" and "Money Back Guaranty," and, for each claim, analyze the ads for the existence of claim qualifiers. Further, the rule engine 210 analyzes the sufficiency of the claim qualifiers, to determine an overall risk to be associated with each claim. The process of identifying claims that require qualification at 542 is described in additional detail below with reference to FIG. 8B.

At 550, issues of specific applicability (ISAs) are identified for certain products or services. ISAs are defined as issues that particularly apply to certain products or services. For example, if an ad associated with a certificate of deposit product type is identified at 530, the rule engine 210 may analyze the ad for phrases such as "Early Withdrawal" and "Penalty," which are directed toward known issues or risk factors for certificates of deposit. In some embodiments, various search terms and phases used for identification of IGAs and ISAs may be stored in the product code database 240 for reference by the rule engine 210. The administrator of the server 130 may access the product code database 240 to modify and supplement the data stored therein, including the product codes and the terms, phrases, or other criteria used for identification of IGAs and ISAs. In this manner, the present invention provides a flexible manner for updating the analysis performed by the rule engine 210. The process of identifying ISAs at 550 is described in additional detail below with reference to FIG. 9.

At 560, product and issue codes and associated data, such as product and issue risk scores, user-specific information, and/or third party data are matched to comments and relevant ads, which may be returned to the client computer 110 for displaying results at step 450. The comments may be matched to certain products or services identified at 530, IGAs identified at 540, or ISAs identified at 550, for example. The comments may also be tailored for a particular user based on the user-specific information related to a particular user. The comments may be further tailored based on information from third parties about products, services, ads, or sponsors of the ads. Product and issue codes and associated data, such as product and issue risk scores, user-specific information, or third party data, may also be matched to relevant ads stored in the advertisement database 260 or other third party databases. In association with the matching to third party relevant ads, the rule engine 210 may convert the format of the product codes, issue codes, and data that may be associated with them, such as product and issue risk scores, user-specific information, and third party data into a tag or other format used by the third party for classifying and identifying the relevant ads that may be served to users. Finally, an overall risk rating is generated at 570, and the process returns to step 450 for displaying results. The processes of matching codes to comments and/or relevant ads and generating an overall risk rating are described in additional detail below with reference to FIGS. 10 and 11.

Figure 6:
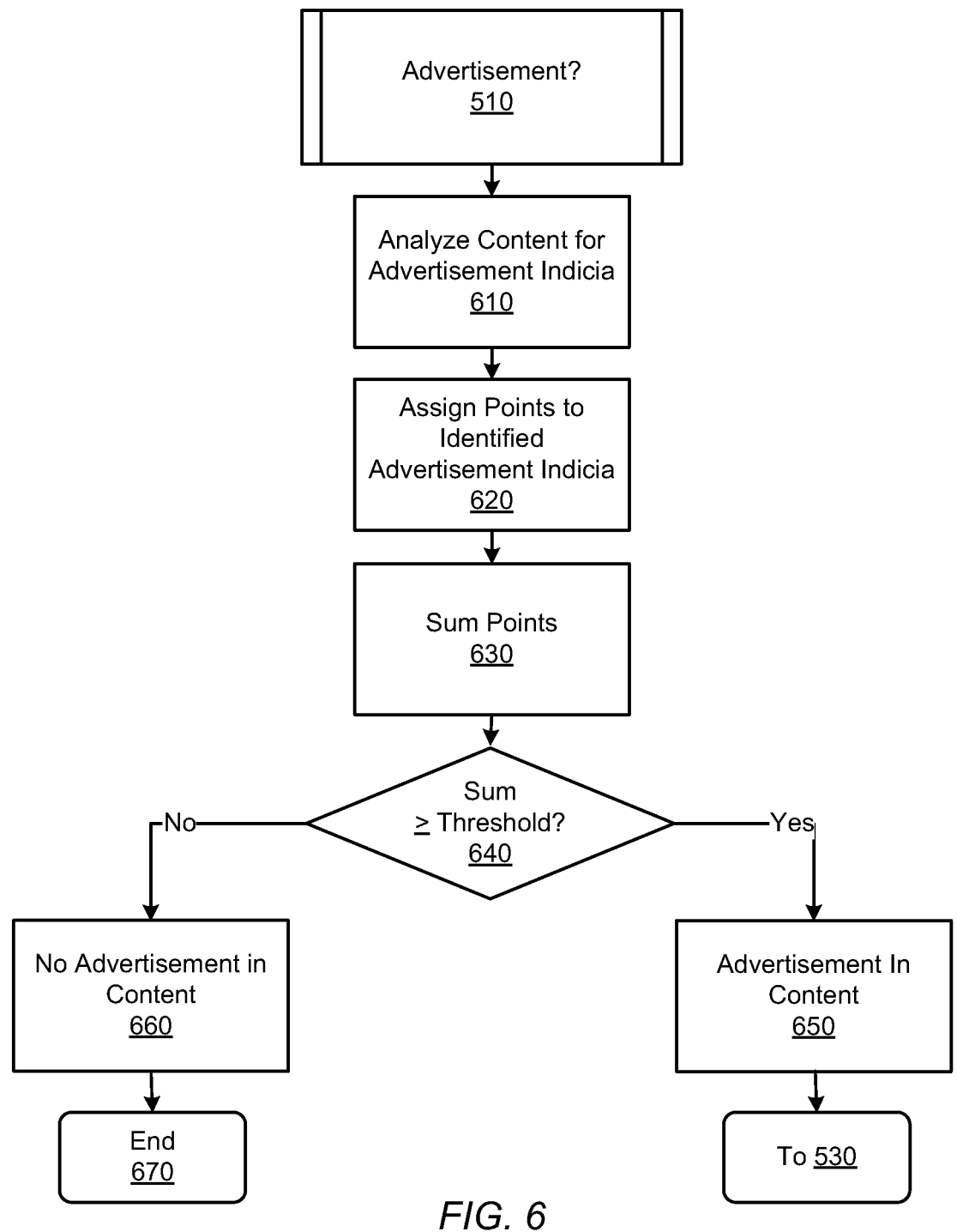
FIG. 6 illustrates an example process flow diagram for identifying an advertisement in content.

Turning to FIG. 6, the process of determining whether an ad is included within online content is described in further detail. The determination of whether online content includes an ad includes analyzing content for advertisement indicia at 610, assigning points to identified advertisement indicia at 620, summing points at 630, and comparing the sum of points to a points threshold at 640.

In connection with analyzing content for advertisement indicia, the rule engine 210 may analyze the online content specified at the URL or other indicator provided by the client computer 110. In some aspects, evaluation results are dependent upon whether words, phrases, conditions or other criteria associated with an ad are present within primary or secondary content associated with the ad. For instance, the rule engine may associate a higher risk to an ad that buries a disclaimer deep within secondary content of the ad, as compared to an ad that provides the disclaimer within primary content of the ad. For this reason, it may be necessary for the rules engine 210 to classify content as either primary or secondary content. As used herein, the general terms "content" and "online content" include both primary and secondary content unless otherwise specified.

In one embodiment, online content specified at a URL is defined as primary content, and additional online content specified at secondary links, URLs, and other pointers within the primary content is defined as secondary content. In other words, the rule engine 210 may analyze primary and secondary content by searching through primary content associated with a URL, and the rule engine 210 may analyze secondary content based on links and other pointers contained within the primary content specified by the URL. Content specified by links and other pointers within the secondary content may also be simply defined under the umbrella of secondary content. Thus, it is noted that the rule engine 210 may analyze several layers or levels of content, the number of which may be preconfigured based on processing capability, timeliness, and quality of results.

The classification of content as primary or secondary may vary, however. For example, the rule engine 210 may be configured to continually reclassify a web page currently viewed as primary content and all previously viewed and/or unviewed web pages as secondary content. A variation on this approach might classify a web page currently viewed as well as all previously viewed web pages as primary content and all unviewed web pages as secondary content. Another variation might classify a web page currently viewed as secondary content and all previously viewed web pages as primary content. In this respect, the classification of content as primary or secondary may be modified by the administrator.

It is additionally noted that, as used herein, the terms "content" or "online content" are broadly defined to include not only words and text within content viewed by a user, but also any other data associated with or derived from such content, in any form. For example, as used herein, online content may include one or more of the following items embedded within an HTML page or other file: credit card payment modules, HTML codes or presentation formats, font sizes, font types, styles, attributes, tags, metadata, pixel dimensions, comments, and scripts.

The rule engine 210 analyzes content based on a plurality of rules or criteria at step 610 to identify indicia of advertisement. It should be noted that portions of the analysis at step 610 may be performed within the client computer 110 using rules downloaded in conjunction with the application software. For example, some of the words, phrases, tags or other criteria used to determine the existence of an advertisement at step 610 may be downloaded in conjunction with the application software and stored as part of an application or other file on the client computer 110. Thereafter, when the user receives, for example, search engine query results including links and associated content, the client computer may parse such content and determine that it contains words, phrases, tags, or other criteria associated with ads, and thus identify an ad within such content. If the user clicks a link within the search query results, a URL of the link and any content associated with the link may be retained by the client computer 110 and transmitted to the server 130 for analysis by the rule engine 210. Additionally, in this case, the link and any content associated with it may be classified as primary content for purposes of the subsequent analysis.

Several examples of rules or criteria by which the rule engine 210 analyzes the primary and secondary content is provided in Table 1 below. Table 1 includes different categories of criteria numbered 1-10. It should be appreciated that the listing of criteria in Table 1 (and Tables 2-5) is not intended to be exhaustive or limiting. For simplicity of discussion and brevity, representative examples of words, phrases, tags, and other criteria for evaluating content are provided in Tables 1-5 in association with a description of the application of the words, phrases, and other criteria by the rule engine 210. In practice, it is noted that the rule engine 210 may evaluate online content using a much greater database of words, phrases, tags, and other criteria.

According to the criteria specified in category 1 of Table 1, content is analyzed by the rule engine 210 to determine if the content includes one or more items presented in a square or rectangular pixel format in a dimension such as 300×250. If an item having a pixel dimension of 300×250 is identified in primary or secondary content by the rule engine 210, the rule engine assigns 3 points to the content. As another example, according to the criteria specified in category 2, the content is analyzed to determine if the content includes words or phrases such as "advertisement," "sponsored ad," "related advertising links," or other criteria that may indicate the existence of an ad. For each such word, phrase, tag, or other criteria contained within the content, the rule engine 210 assigns a pre-determined number of points to the content according to Table 1. For the category 2 words, phrases, tags, or other criteria, the rule engine 210 only assigns points based on the category 2 word, phrase, tag, or other criteria having the highest associated points value, rather than assigning points associated with each category 2 word, phrase, tag, or other criteria. In that sense, each of the categories in Table 1 may be associated with an additional set of rules, conditions, or attributes that are unique for the category. In step 630, all of the points assigned to the content in step 620 are tallied to generate a points total.

With regard to the syntax of the criteria listed in the tables below, an asterisk (*) represents a wildcard character string. That is, the rule engine 210 would identify the word "advertisement" as a match for the phrase "advert*". The notation "W/n" indicates that words must be within a certain number-of-words proximity to each other to satisfy the rule. For example, for the rule "expires W/5 date," a string of words must include "expires" within 5 words of "date" to satisfy the rule. Also, the notations "OR" and "AND" designate their respective logical operations, and the criteria may or may not be case-sensitive.

Some categories in Table 1, such as categories 10 and 12, are not necessarily related to the content itself, but are rather related to how a user of the client computer 110 arrived at or received the content. According to the criteria of category 10, points are added to the points total based on whether the content was returned in response to a search query from a search engine such as Google® or Bing®. In that context, to aid the server 130 in analyzing the content currently being displayed at the client computer 110, the client computer 110 may send information to the server 130 that is in addition to or alternative to a URL. For example, according to the criteria of category 12, the client computer 110 may indicate to the server 130 that the content currently being displayed at the client computer 110 was delivered by e-mail or in response to a search query at a search engine.

After the rule engine 210 analyzes the primary and secondary content based on the criteria specified in Table 1 and all of the points assigned to the content in step 620 are tallied to generate a points total at step 630, the rule engine compares the sum of points in the points total to a points threshold at step 640. The points threshold may be specified by the administrator based on empirical results or other known factors. If the sum of points is greater than or equal to the points threshold, the rule engine 210 proceeds to step 650, where it is determined that at least one ad is contained within the online content displayed at the client computer 110, and the process returns to step 530 to determine one or more types of products or services associated with the at least one ad. If the sum of points is less than the points threshold, the rule engine 210 proceeds to step 660, where it is determined that no ads are contained within the online content displayed at the client computer 110, and the process ends at step 670.

TABLE 1

| Criteria for Advertising Indicia | Associated Points |
|---|---|
| 1. Content includes one or more items presented in a square or rectangular format in one of the following pixel dimensions: | |
| 300 × 250, 180 × 150, 728 × 90, 160 × 600, 300 × 600, 120 × 60, 88 × 31 or 550 × 480 | 3 |
| 250 × 250, 240 × 400, 336 × 280, 300 × 100, 720 × 300, 468 × 60, 234 × 60, 120 × 90, 120 × 240, 125 × 125, 120 × 600 or 550 × 480 | 2 |
| 2. Content includes any of the following words or phrases: | NOTE: If multiple items are identified in this category, only count the one item with the highest point value. |
| Advertisement | 3 |
| Ad | 2 |
| Ads | 2 |
| Paid Advertisement | 4 |
| Paid Ad | 4 |
| Sponsor | 3 |
| Sponsored Ad | 4 |
| Sponsored Result | 4 |
| Related Advertising Links | 3 |
| 3. Content includes any of the following words or phrases: | NOTE: If multiple items are identified in this category, only count the one item with the highest point value. |
| Apply Now (with operable link/button) | 4 |
| Apply (with operable link/button) | 3 |
| Open (with operable link/button) | 2 |
| Open W/3 Account (with operable link/button) | 3 |
| Quote (with operable link/button) | 4 |
| Get Started (with operable link/button) | 3 |
| Learn More (with operable link/button) | 4 |
| 4. Content includes any of the following words or phrases: | NOTE: If multiple items are identified in this category, only count the one item with the highest point value. |
| Need Help? (with operable link/button) | 4 |
| Chat Now (with operable link/button) | 4 |
| Chat (with operable link/button) | 3 |
| Live Chat (with operable link/button) | 3 |
| 5. Content includes any of the following words or phrases: | NOTE: If multiple items are identified in this category, only count the one item with the highest point value. |
| Add to Cart | 3 |
| Shopping Cart | 3 |
| View Cart | 3 |
| Checkout | 2 |
| Ratings/Reviews | 3 |
| 6. Content includes any of the following words or phrases: | NOTE: If multiple items are identified in this category, only count the one item with the highest point value. |
| Restrictions Apply | 2 |
| APY | 4 |
| Free | 2 |
| Money Back | 3 |
| Guaranteed | 3 |
| As Seen On | 3 |
| Up to **% Off | 3 |
| Save Up To | 3 |
| Coupon Code | 4 |
| Expires W/5 Date | |
| 7. Content includes any of the following words or phrases: | NOTE: If multiple items are identified in this category, only count the one item with the highest point value. |
| Terms W/1 Conditions | 4 |
| Disclosures | 4 |
| 8. Content includes any of the following words or phrases: | |
| FDIC | 2 |
| 9. Content includes an asterisk (*) or numbered superscript/subscript | 3 |
| 10. Content was returned in response to a search query | 3 |
| 11. Content contains a field for collection of credit card data | 3 |
| 12. Running point total is greater than X points and content was delivered to user by e-mail | 4 |

Figure 7:
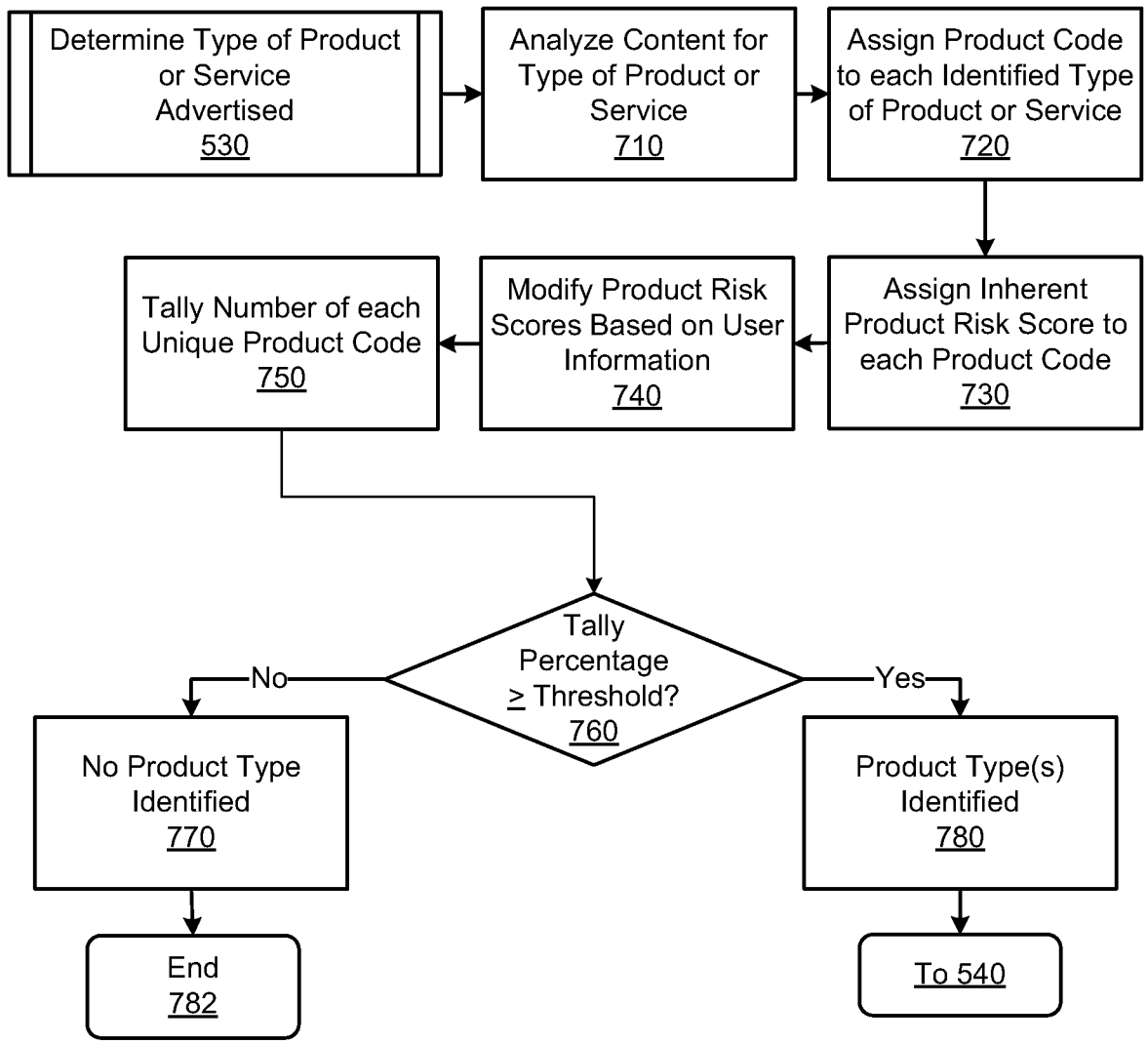
FIG. 7 illustrates an example process flow diagram for determining a product or service type associated with an advertisement.

Referring to FIG. 7, an example of the process of determining a type of product or service advertised is described in further detail. The determination of a type of product or service advertised includes analyzing content for a type of product or service at step 710, assigning a product code to each identified product or service at step 720, assigning an inherent risk score to each product code at step 730, modifying product risk scores based on available user specific information, if any, at step 740, tallying a number of instances each unique product code was at step 750, and comparing a percentage proportion of each product tally with a product threshold at step 760.

At step 710, the rule engine 210 analyzes primary and secondary content for particular types of products and services based on a plurality of rules or criteria. Examples of the rules or criteria are provided in Table 2 below. The listing of criteria in Table 2 is not intended to be exhaustive or limiting, and the listing may be stored in the product database 249, among other locations on the server 130, and modified by the administrator. In one example from Table 2, the rule engine 210 analyzes primary and secondary content for the phrase "diet pill." If the rule engine 210 identifies the phrase, the rule engine 210 assigns a product code associated with the phrase at step 720. With reference to Table 2, the product code associated with the phrase "diet pill" is "WLP." Here, it is important to note that the rule engine 210 may assign more than one product code when analyzing primary and secondary content. In other words, initially, the rule engine 210 may find that content satisfies two or more rules associated with different products.

At step 730, the rule engine assigns an inherent risk score to each assigned product code. With reference to Table 2, the inherent risk score associated with the WLP code is 3 points. While analyzing content for types of products and services, the rule engine 210 may reference the product code database 240 for a listing of product codes and respective inherent risk scores. A value of each inherent risk score may be set by the administrator based on empirical analysis and other factors.

At step 740, the risk score assigned to a product or service is modified based on user-specific information, if any. For example, the risk score assigned to a product or service may be modified based on user-specific information such as credit rating, employment status, or financial condition. The user-specific information may be provided by a user while registering an account at step 420 as described above, or thereafter by logging back into, for example, the account settings tab in the user control interface 130. When sending information related to the content currently being displayed at the client computer 110, the client computer 110 may also send a user-identifier to the server 130 that identifies a particular user of the client computer 110. For instance, a user of the client computer 110 may be prompted to enter the account name and password registered at step 420, so that the server 130 can identify the user of the client computer 110 and retrieve any user-specific information for the user from the user database 230.

In Table 2, each of the columns "User Adjustment 1" and "User Adjustment 2" may be associated with a particular type or category of user-specific information. For example, the User Adjustment 1 column may be related to a user's job status, and the User Adjustment 2 column may be related to a user's self-estimated credit rating. According to Table 2, an extra point of risk is associated with the credit card (CC) product type for a user having an unemployed job status. Also, an extra risk point is associated with the credit card (CC) product type for a user having a low credit rating. The user-specific risk points may take values greater than one and less than zero, as well as zero in certain circumstances, among embodiments. The values of the user-specific risk points may be stored in the user database 230 or associated with the retained product code, and modified by the administrator. While Table 2 depicts two user adjustment steps, the number of potential adjustment steps may vary significantly depending upon the embodiment to further refine the risk analysis based on the user specific data.

At step 740, the inherent product risk score assigned at step 730 is "modified" by the user-specific risk scores in the user adjustment columns by summing the inherent product risk score with the user-specific risk scores, to arrive at a product code/total point score combination. In other embodiments, the inherent product risk score assigned at step 730 may be "modified" by the user-specific risk scores by subtracting the user-specific risk scores from the inherent product risk score, to arrive at the product code/total point score combination. At step 750, a tally is taken to determine a total number of instances each unique product code was assigned at step 720. As noted, the rule engine 210 may assign a product code for each word, phrase, or other criteria or item from Table 2 that is identified within or associated with the content. Thus, the rule engine may assign four CC product codes, two CD product codes, and two CA product codes at step 720. A tally of the number of each unique product code is taken at step 750, and a percentage proportion of each tally is compared with a product threshold at step 760. In the example above, the four CC codes represent 50% of the total number of all identified product codes. Similarly, the two CD and the two CA codes each represent 25% of the total number of all identified product codes. For a product threshold of 49%, the 50% percentage proportion of the four CC codes passes the product threshold at step 760, while neither of the 25% percentage proportions of the CD or CA codes pass the product threshold at step 760.

Based on the example above, the content is determined to contain an ad for a credit card at step 780. If no percentage proportion of product codes is greater than or equal to the product threshold, the process proceeds to step 770 where it is determined that no product type is identified in the content. It should be appreciated that, even if multiple product codes are assigned by the rule engine at step 210, the process may still result in a determination that no product type is identified in online content, especially if the product threshold is set by the administrator to a value of greater than 50%. In this manner, the method 530 of determining a type of product or service advertised may include a filter based on the value of the product threshold, to help mitigate against incorrect product identifications.

TABLE 2

| Criteria for Determining Type of Product or Service Advertised | Product/ Service Code | Risk Score | User Adjust- ment 1 | User Adjust- ment 2 | Code and (Points Sum) |
|---|---|---|---|---|---|
| "%" W/3 (APY OR "Annual Percentage Yield") | CD | 0 | 0 | 0 | CD(n) |
| "Certificate of Deposit" OR CD | CD | 0 | 0 | 0 | CD(n) |
| Diet Pill | WLP | 3 | 0 | 0 | WLP(n) |
| Credit Card | CC | 1 | 1 | 1 | CC(n) |
| APR OR "Annual Percentage Rate" | CC | 0 | 0 | 0 | CC(n) |
| Secured Card | SC | 1 | 0 | 0 | SC(n) |
| Checking Account | CA | 0 | 0 | 1 | CA(n) |

As noted above, an inherent product risk score assigned at step 730 is "modified" by the user-specific risk scores in the user adjustment columns at step 740 by summing the inherent product risk score with the user-specific risk scores, to arrive at a product code/total point score combination. Continuing with the example that online content is determined to include an ad for a credit card based on a large number of assigned CC product codes, the product code/total point score for the user in Table 2 is CC(3), because the CC product code is associated with one inherent risk point which was modified (i.e., increased) by two based on the two user-specific risk points. In Table 2, the "n" is the code/total point score combination column designates the total point score.

The product code/total point score for the product identified at step 780 is relied upon in various aspects of determining issues of specific applicability at step 550, and matching codes to comments and relevant ads at step 560. Because more than one code of the same product type may be assigned by the rule engine 210, more than one product code/total point score may be determined. In one embodiment for this case, the product code having the highest total point score is retained for the processes 540, 550, 560, and 570, and the remaining product codes of the same product type are discarded. A retained product code may also be associated with related user-specific information. For example, a user's address or geolocation may be associated with a retained product code to identify or further refine relevant ads or offers that may be served to the user.

Figure 8A:
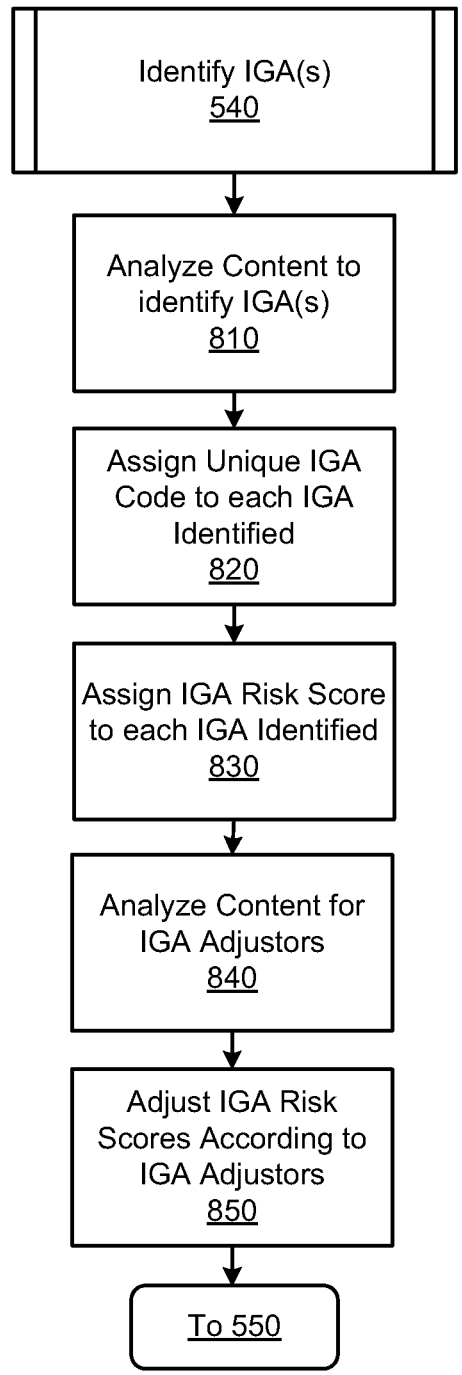
FIG. 8A illustrates an example process flow diagram for identifying issues of general applicability in advertisements.

Turning to FIG. 8A, an example of the process of identifying IGAs in advertising is described in further detail. The process of identifying IGAs includes analyzing content to identify issues of general applicability at step 810, assigning IGA codes at step 820, assigning an IGA risk score to each identified IGA at step 830, analyzing content for IGA adjustors at step 840, and adjusting IGA risk scores according to identified IGA adjustors at step 850.

With reference to Table 3A below, the content is analyzed using the search criteria specified in Part A of Table 3A, to identify IGAs at step 810. According to one example of the criteria listed in Table 3A, the primary and secondary content is analyzed to determine if the content contains an asterisk or a superscript/subscript qualifier. If so, an associated one of the unique IGA codes listed in Table 3A is assigned to the content at step 820. That is, if the content contains an asterisk, the IGA code "$IGA^A$" is assigned to the content, and if the content contains a superscript/subscript qualifier, the IGA code "$IGA^B$" is assigned to the content. The criteria listed in Table 3A is provided as an example and is not intended to be exhaustive, and it is noted that the rule engine 210 may assign more than one IGA code to the content based on the criteria listed in Table 3A. At step 830, each assigned IGA code is also assigned a number of risk points as a general issue risk score according to the listing of IGA code risk points in Table 3A, for example, to arrive at an IGA code/IGA risk point combination (i.e., $IGA^B(1)$).

At step 840, the content is analyzed using the IGA adjustor criteria in Part B of Table 3A. Each IGA adjustor criteria is associated with a value of IGA adjustor points. Thus, at step 850, if a superscript character corresponding to the superscript character identified at step 810 is not found in the content, the IGA code $IGA^B$ is adjusted by 2 according to the IGA adjustor points listed in Table 3A, to arrive at an adjusted IGA code/IGA risk point combination of $IGA^B(3)$.

The process illustrated in FIG. 8A operates similarly with the IGA search criteria, IGA risk points, IGA adjustor criteria, and IGA adjustor points listed in Table 3B. The process also operates similarly with the IGA search criteria and IGA risk points listed in Table 3C, but without the additional IGA adjustor criteria (i.e., Part B adjustor criteria). Thus, Table 3C is provided as an example of IGAs that may be identified and assigned IGA risk points, but not adjusted with IGA adjustor points. Tables 3A-3C are not intended to be exhaustive of IGA criteria, and the administrator may modify and supplement the IGA criteria in Tables 3A-3C (i.e., add data associated with new tables). Among embodiments, the adjustor criteria in Part B of Tables 3A and 3B may be based on available user-specific information and/or other available data. That is, the IGA adjustor criteria or associated adjustor points in Part B of Tables 3A and 3B may be based on or tailored, at least in part, upon user-specific information and third party data. Likewise, the IGA search criteria or associated risk points in Part A of Tables 3A-3C may be tailored, at least in part, upon user-specific information. In that sense, the present invention recognizes that an issue of general applicability may present a different risk for one user than for another, and make adjustments accordingly.

The IGA code/IGA risk point combinations are relied upon in various aspects of matching codes to comments, as described below. It is noted that, when analyzing content for IGAs, the types of products or services determined to be associated with the content are typically not considered. This is in contrast to when the online content is analyzed for ISAs, as described below.

TABLE 3A

| IGA Search Criteria | IGA Code | IGA Code Risk Points |
|---|---|---|
| 1. Part A: Identify any of the following initial qualifiers in content: | | |
| Asterisk (*) | $IGA^A$ | 1 |
| Superscript/Subscript (i.e., ¹, ², *) | $IGA^B$ | 1 |
| 2. Part B: For each initial qualifier (with associated IGA comment code) identified in Part A: | | Adjustor Points |
| Does content also contain a corresponding (identical) qualifier that follows the initial qualifier on the same page? | | Yes = 0<br>No = +2 |
| If the initial qualifier is the term "disclaimer," is it located within the last two text lines on the page of content? | | Yes = +2<br>No = 0 |
| If the initial qualifier is the term "disclaimer" and is part of an active link, is the link underlined? | | Yes = 0<br>No = +1 |

TABLE 3B

| IGA Search Criteria | IGA Code | Risk Points |
|---|---|---|
| 1. Part A: Identify any of the following words or phrases in content: | | |
| Fees | $IGA^C$ | 0 |
| Terms and Conditions | $IGA^D$ | 1 |
| 2. Part B: For each word or phrase (with associated IGA comment code) identified in A: | | Adjustor Points |
| Is word or phrase W/5 of *, ¹, the word "no," or an active link or button? | | Yes = 0<br>No = +1 |
| If word or phrase is W/5 of an active link or button, does the active link or button open to more than 2 full pages of text? | | Yes = +2<br>No = 0 |

TABLE 3C

| Search Criteria | IGA Code | Risk Points |
|---|---|---|
| 1. Part A: Identify any of the following words or phrases in content: | | |
| ("Certificate of Deposit" OR CD) W/2 Institute | $IGA^E$ | 1 |
| "Diet Pill" W/2 Institute | $IGA^F$ | 0 |

Figure 8B:
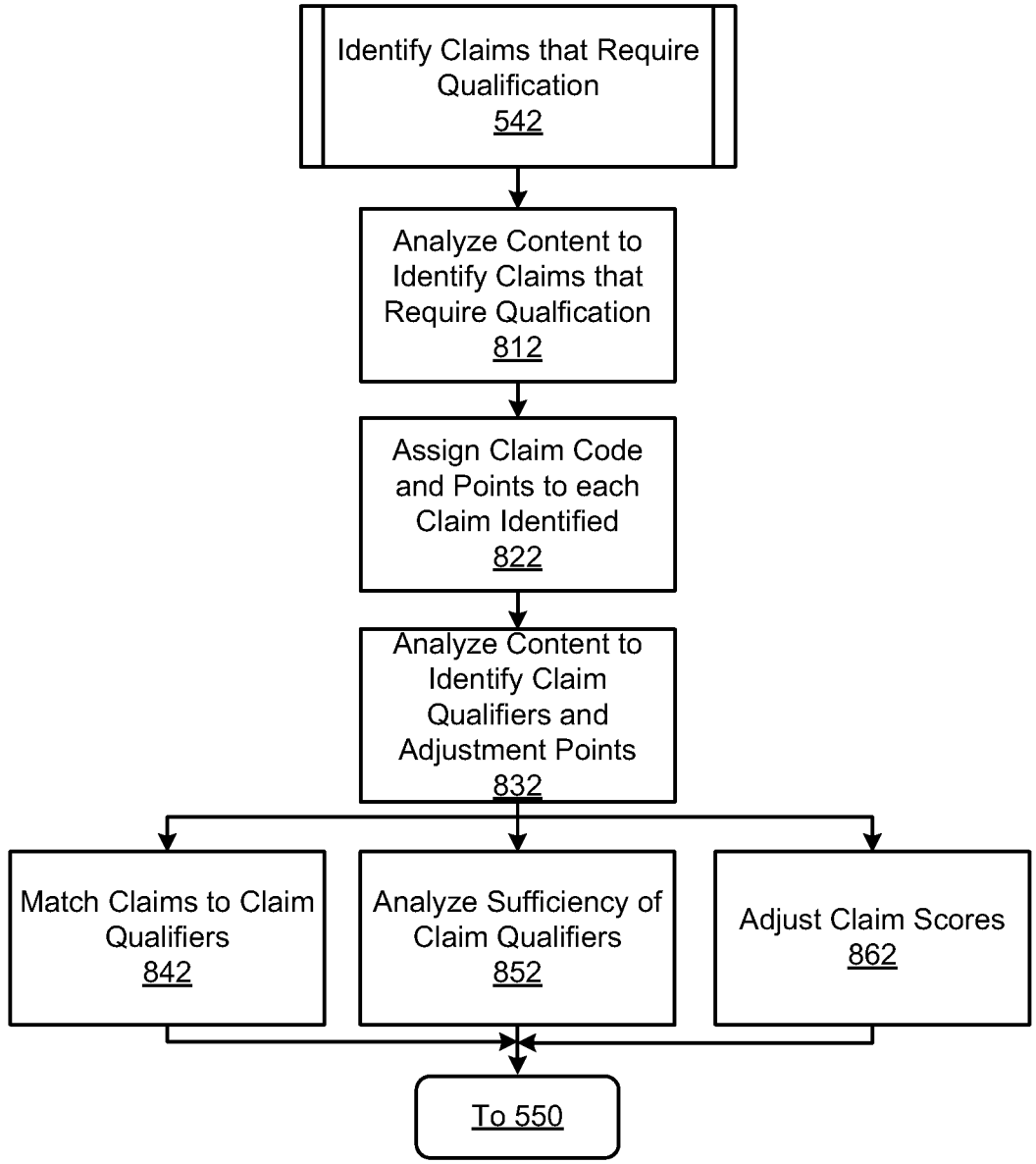
FIG. 8B illustrates an example process flow diagram for identifying claims that require qualification.

Additionally or alternatively to the process of identifying IGAs, the rule engine 210 may also execute the process of identifying claims that require qualification. A "claim" may be defined as an express or implied statement made to induce a user to purchase a product or service. A claim typically relates to features, attributes, performance, quality, or pricing. With reference to FIG. 8B and Table 4, the rule engine 210 analyzes content to identify claims such as, for example, "Risk Free" and "Money Back Guaranty" at step 812, using the criteria in Part A of Table 4.

For each claim identified in step 812, the rule engine 210 assigns a claim code and claim points to the claim at step 822, according to the examples listed in Table 4, to arrive at a claim code/claim point score combination. With reference to Parts B and C of Table 4, the rule engine 210 also analyzes the content to identify claim qualifiers at step 832. In addition to identifying claim qualifiers at step 832 (i.e., Part B of Table 4), the rule engine 210 also determines the sufficiency of each claim and/or claim qualifier (i.e., Part C of Table 4) at step 852 according to factors such as the locations of the claim qualifiers in the content, the proximity of such qualifiers to the claims they qualify, the font size and visibility of the claim qualifiers, the number of the claim qualifiers, and the operability of the claim qualifiers, for example. Using the points listed in Table 4 in association with the claim qualifiers in Part B and the sufficiency of the claims and claim qualifiers in Part C, the rule engine 210 adjusts the claim points assigned to each claim code in step 822, at step 862.

TABLE 4

| | Claim Code | Claim Points |
|---|---|---|
| 1. Part A: Identify claims that require qualification. Identify any of the following words, phrases, or punctuation that requires qualification: | | |
| Free NOT W/2 Risk | A | 2 |
| Best OR Finest OR Top | B | 1 |
| Money Back OR Guaranty OR Guaranteed | C | 3 |
| Limited W/2 First | D | 3 |
| Risk W/2 (No OR Free) | E | 1 |
| Sale Price Comparisons to a Reference Price | F | 1 |
| Bundled Service Discounts | G | 1 |
| (Save OR Savings) W/3 ($ OR Dollars OR % OR Percent) | H | 1 |
| Product Uniqueness Claims [reserved] | I | 1 |
| New W/3 (Law OR Regulation OR Act) | J | 3 |
| Highest W/3 (Rate OR Yield) | K | 1 |
| | NOTE: If multiple instances of one of the words or phrases are found, count the associated points only once. | |
| 2. Part B: Determine whether identified claims have been qualified. | | |
| For each claim identified in 1 above, determine if it has been qualified by searching content for the following terms, words, phrases, or punctuation: | Adjustment Points to Associated Claim Code | |
| Terms and Conditions | −1 | |
| Restrictions | −1 | |
| Limitations | −1 | |
| See w/3 Details | −1 | |
| Disclosures | −1 | |
| Disclaimer | −1 | |
| Legal Disclaimer | −1 | |
| 3. Part C: Analyze location and sufficiency of each qualifier. Determine location and sufficiency of the qualifiers. Generally, these rules provide that the further an initial qualifier is from the original claim, the more points it will receive. | Adjustment Points to Associated Claim Code | |
| Does claim have no associated qualifier? | +4 | |
| Is qualifying text presented in font size less than 50% of the font size of the claim text? | Y = +2, N = 0 | |
| Does claim including an asterisk (*) or superscript/subscript (i.e., $^{1,\ 2,\ *}$) have no identical corresponding qualifier? | Y = +2, N = 0 | |
| Is qualifier in grey or low contrast color that is different than the color used for the claim itself? | Y = +2, N = 0 | |
| Does qualifier appear within same or immediately following sentence in which the claim appears? | Y = +2, N = 0 | |
| Does qualifier corresponding to claim appear on same page as the claim? | Y = 0, N = +2 | |
| Is qualifier a statement that does not link (or an inoperable link) to qualifying text? | Y = +2, N = 0 | |
| Does qualifier contain a link? | Y = +1, N = 0 | |
| Where qualifier is an active link: | | |
| Can the link be bypassed (i.e., can the consumer proceed to next page without being required to launch the link)? | Y = +1, N = −1 | |
| Does one or more words or phrases within the first 10 words of qualifying text match words or phrases in the claim? | Y = −1, N = +1 | |
| Does link open to voluminous text with no apparent direction to relevant information? | Y = +2, N = 0 | |
| Does link display qualifying text when cursor hovers over it? | Y = −1, N = 0 | |
| If Y, is qualifying text displayed immediately and for as long as the cursor hovers? (i.e. it appears as long as the consumer hovers) | Y = −2, N = +2 | |

It is noted that determining the sufficiency of each claim and/or claim qualifier (i.e., Part C of Table 4) at step 852 may require, in some cases, matching claims to claim qualifiers at step 852. For example, a claim at the top of the ad may state that a CD has a "2% APY." Then, at the bottom of the same page, a corresponding phrase may appear with qualifying text such as "stated APY based on a $5000 initial deposit." Generally, the closer the corresponding claim qualifier is to the claim, the lower the risk to the user. Thus, the rule engine 210 may seek to match each claim with a respective claim qualifier, for adjusting the claim points with respective claim qualifier points. In certain aspects, each claim identified in content is expected to have a matching qualifier which occurs later in the content. Ideally, each identified claim requiring further qualification should be matched by the rule engine 210 with the closest qualifier that appears prominently after the claim. If more than one claim appears in content before a qualifier appears and the rule engine 210 is unable to match each claim to a respective claim qualifier, the rule engine 210 may apply the adjustment points associated with a qualifier to each of the claims. Alternatively, the rule engine 210 may not apply any adjustment points to the claims when the rule engine 210 is unable to match each claim to a respective claim qualifier. In certain circumstances, the rule engine 210 may also identify claim qualifiers although no claims are identified. In this case, the rule engine 210 considers the ad to contain a claim that must be qualified, although the claim may not have been identified using the criteria in Part A of Table 4. In this case, the rule engine 210 may assign the words or phrase immediately preceding the claim qualifier as a claim matched with the claim qualifier, and the claim and matched qualifier is treated like any other claims and matched qualifier in this or subsequent steps.

Additionally or alternatively to identifying IGAs and identifying claims that require qualification, the rule engine 210 may be configured to search content for other words, phrases, tags, or other criteria related to ad terms such as, for example, auto-renewal features, ad-on charges, misleading testimonials including testimonials regarding contest winners, questionable endorsements, affiliations, or sponsorships, and pre-checked or pre-selected options (i.e., negative check off options). The identification of any of these items may be attributed by the risk engine 210 with risk points which are applied as a factor in the overall risk score described below with reference to FIG. 11.

Turning to FIG. 8B, an example of the process of identifying ISAs in advertising is described in further detail. The process of identifying ISAs includes analyzing content to identify issues of specific applicability based on product codes at step 910, assigning ISA codes at step 920, assigning an ISA risk score to each identified ISA at step 930, analyzing content for ISA adjustors at step 940, and adjusting ISA risk scores according to identified ISA adjustors at step 950. Additionally, the process of identifying ISAs may also include adjusting ISA risk scores based on user specific data and/or third party data at step 932.

With reference to Table 5A below, the content is analyzed with reference to the product codes determined in the processes discussed above using the search criteria specified in Part A of Table 5A, to identify ISAs at step 910. It should be appreciated here that the search for ISAs is product or service specific, based on the product codes previously determined. This is in contrast to the search for IGAs, in which general issues were identified. Here, issues specific to particular products and services are identified and evaluated.

According to one example of the search criteria listed in Table 5A for a certificate of deposit product type, the content is analyzed to determine if the content contains a string of words that matches the expression "Early Withdrawal OR Maintenance W/4 (fee* OR penalt*) NOT W/4 No." That is, if the content has been previously determined to include an ad for a certificate of deposit, the ad is further evaluated according to a subset of rules specifically applicable to certificates of deposit to identify if the advertised certificate of deposit includes an early withdrawal penalty. By using a subset of rules that correspond to a specific product code, the rules engine may avoid unnecessary execution of ISA rules for other products or services that are not relevant to the analysis, thereby reducing processor capacity requirements and maximizing processing speeds.

If a matching expression or other criteria is identified, an associated one of the unique ISA codes listed in Table 5A is assigned to the content at step 920. For the early withdrawal penalty example, the ISA code "ISA(CD)$^B$" is assigned to the content or ad. The criteria listed in Table 5A is provided as an example and is not intended to be exhaustive, and it is noted that the rule engine 210 may assign more than one ISA code to the content based on the criteria listed in Table 5A.

At step 930, each assigned ISA code is also assigned a number of risk points as a specific issue risk score according to the listing of ISA risk points listed in Table 5A, for example, to arrive at an ISA code/ISA risk point combination (i.e., ISA(CD)$^B$(2)). Here, it is important to highlight that the assignment of risk points is dependent upon where the phrase "early withdrawal penalty" exists in the content. Specifically, points are assigned to the ISA(CD)$^A$ code at step 930 if the phrase is present only within secondary content, but not if the phrase is present within primary content, as indicated in Table 5A. As discussed above, secondary content may be defined as content specified at secondary links, URLs, and other pointers within primary content.

It should be pointed out that advertisers vary in their marketing techniques and, while one may choose to conspicuously advise viewers that a product includes a penalty for early withdrawal, another may choose to bury the notice of the penalty deep within levels of online content. In one sense, the format of online content differs from traditional print formats in as much that traditional print formats could be viewed from one page to the next until all pages have been reviewed. In contrast, many pages of online content may only be accessible via links and, then, only from certain secondary pages nested within pages of primary content. As such, online content may present a type of maze which is difficult or unrealistic for users to navigate. Further, some advertisers permit users to bypass key terms or conditions applicable to the offer, (i.e. proceed directly from primary content to checkout or purchase without having to view what might be important limitations or restrictions on the offer). The present invention helps to address this problem by leveraging the processing ability of a computer (i.e., the server 130) to parse ahead and/or in backwards through relevant content thoroughly, consistently, and without error. Where a user is unlikely to have the skills or patience to sort through various levels of secondary content searching for hidden disclaimers and terms, the server 130 and the rule engine 210 executing on the server 130 is better suited to sort through the content. It is also noted that, while many of the processes above were described in terms of identifying words, phrases, tags, punctuation, and other types of criteria in "content" generally, those processes may also be flexibly applied in view of the level of content in which analysis is being performed.

At step 940, the content is analyzed using the ISA adjustor criteria in Part B of Table 5A. Each ISA adjustor criteria is associated with a value of ISA adjustor points. Thus, at step 950, if a word or phrase identified in Part A is less than 50% of the largest font size in the content, the ISA code is adjusted by 2 according to the ISA adjustor points listed in Table 5A, to arrive at an adjusted ISA code/ISA risk point combination of ISA(CD)$^B$(2). Further, as noted for this case in Table 5A, the rule engine 210 is also configured to identify and redisplay the phrase "early withdrawal penalty" in association with adjusting the ISA risk point total. The redisplay may occur in a redisplay highlight box, as described in further detail below. Specifically, the phrase "early withdrawal penalty" and associated content may be redisplayed for a user in highlighted, bolded, or enlarged text, so that the terms of the penalty are more visible. The phrase "early withdrawal penalty" may be enlarged and redisplayed along with the entire paragraph or section in which the phrase (and any other details) appears. For example, an enlarged redisplay may occur from an HTML section heading that precedes the phrase up to but not including a next HTML section heading. Again, rules or criteria that incorporate a redisplay of words or phrases may be integrated within the criteria listed in any of the tables described herein. These types of additional rules may be set by the administrator in a flexible manner. Also, among embodiments, the adjustor criteria in Part B of Tables 5A and 5B may be based on available user-specific information and/or other available data. That is, the ISA adjustor criteria or associated adjustor points in Part B of Tables 5A and 5B may be based on or tailored, at least in part, upon user-specific information and third party data.

Figure 9:
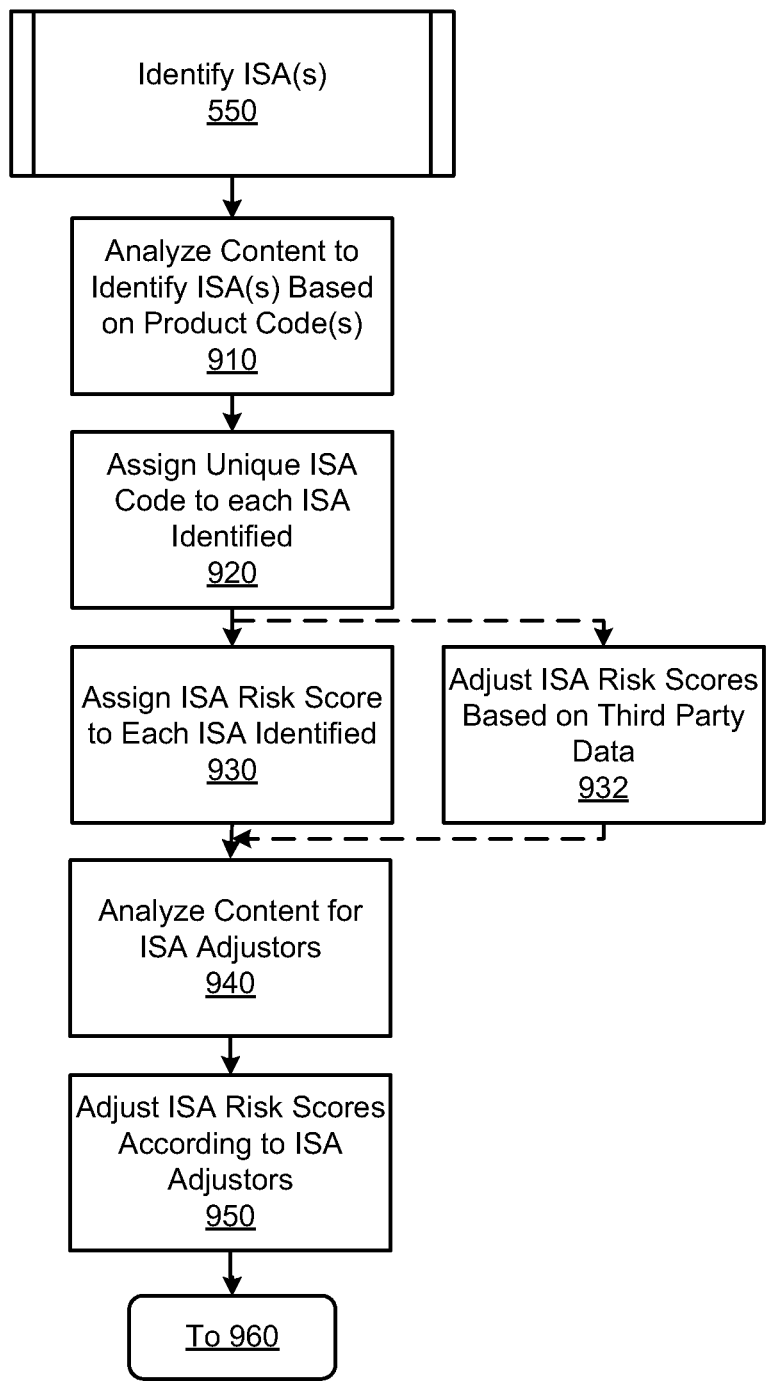
FIG. 9 illustrates an example process flow diagram for identifying issues of specific applicability in an advertisement.

The process illustrated in FIG. 9 operates similarly with the ISA search criteria, ISA risk points, ISA adjustor criteria, and ISA adjustor points listed in Table 5B. The process also operates similarly with the ISA search criteria and ISA risk points listed in Table 5C, but without the additional ISA adjustor criteria (i.e., Part B adjustor criteria). In other words, Table 5C is provided as an example of ISAs that may be identified and assigned ISA risk points, but not adjusted with ISA adjustor points. Tables 5A-5C are not intended to be exhaustive of ISA criteria, and the administrator may modify and supplement the ISA criteria in Tables 5A-5C (i.e., add data associated with new tables). The ISA code/ISA risk point combinations are relied upon in various aspects of matching codes to comments and relevant ads, as described below.

In some embodiments, ISA risk scores may also be adjusted based on user specific data and/or third party data at step 932. For example, the rule engine 210 may have access to one or more third party databases which store information related to risks associated with certain products or services or user experiences with certain products or services and/or specific vendors of such products or services. Examples of such third party data may include, but are not limited to, court or regulatory orders applicable to products, services or their vendors, ratings and review results or data, Better Business Bureau ratings, and other third party data relating to products, services and/or their vendors. Thus, the rule engine 210 may further adjust the ISA risk scores based on the third party data. In this process of adjusting the ISA scores with third party data, an intermediate step of mapping the third party data to the product codes relied upon by the rule engine 210 may be required. To that end, the rule engine 210 may be further configured to map third party data codes or other metrics to product codes stored in the product code database 240 using a lookup table or other means.

TABLE 5A

| ISA Search Criteria for CD Product Code | Product Code | ISA Risk Points |
|---|---|---|
| 1. Part A: Identify any of the following words or phrases in primary or secondary content: Early Withdrawal OR Maintenance W/4 (Fee* OR Penalt*) NOT W/4 No | ISA(CD)$^A$ | No = 0 Yes (Pri. Only) = 0, Yes (Pri. and Sec.) = 0, Yes (Sec. Only) = 2 |
| ((Early Withdrawal W/2 Fee OR Penalt*) W/5 Calculated OR Method) | ISA(CD)$^B$ | No = 0 Yes = 2 (Redisplay Instructions) |
| 2. Part B: For each word or phrase identified in Part A: Is the identified word or phrase in a font size less than 50% of the largest font size in content? | | Adjustor Points No = 0 Yes = 2 (Redisplay Instructions) |
| Is the identified word or phrase more than 1 click away from primary content? | | No = 0 Yes = +2 for each click beyond one |
| If the initial qualifier is the term "disclaimer" and is part of an active link, is the link underlined? | | No = +1 Yes = 0 |

TABLE 5B

| Search Criteria for WLP Product Code | Product Code (ISA Code) (ISA Points) | Risk Points |
|---|---|---|
| 1. Part A: Identify any of the following words or phrases in Primary or Secondary content: (Lose W/5 (Weight OR Pounds OR Lbs.)) W/5 (Days OR Week* OR Months) | ISA(WLP)$^A$ | 2 |
| "Clinically Proven Weight Loss" OR "You Will Lose Weight" | ISA(WLP)$^B$ | 2 |
| 2. Part B: For each word or phrase identified in Part A: Is the identified word or phrase followed W/2 of * OR $^1$ OR (Results W/5 (Vary OR Not Typical))? | | Adjustor Points Yes = +1 (Redisplay Instructions) No = 0 |
| Is there a qualifier such as * OR $^1$ OR operable link no further than immediately following the sentence in which the word or phrase appears? | | Yes = +1 (Redisplay Instructions) No = 0 |

TABLE 5C

| Search Criteria for WLP Product Code | Product Code (ISA Code) (ISA Points) | Risk Points |
|---|---|---|
| 1. Part A: Identify any of the following words or phrases in Primary or Secondary content: No W/4 (Representation OR Warran*) | ISA(WLP)$^C$ | 1 (Redisplay Instructions) |
| No W/20 Endor* | ISA(WLP)$^S$ | 1 (Redisplay Instructions) |

Figure 10:
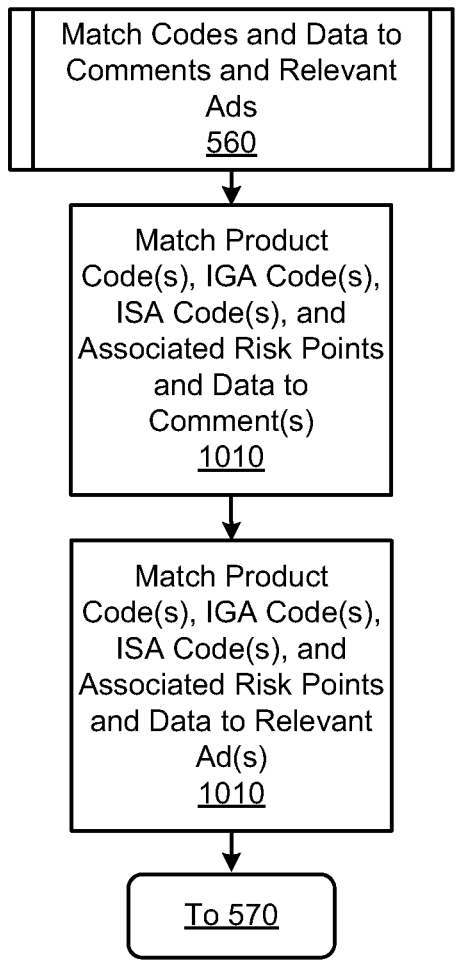
FIG. 10 illustrates an example process flow diagram for matching issues associated with an ad or a product or service to comments and relevant advertisements.

Turning to FIG. 10, the process of matching codes and other relevant data to comments and relevant ads is described in further detail. The process of matching codes, risk points, and any other relevant data to comments and relevant ads includes matching product codes, IGA codes, ISA codes, and associated risk points and other relevant data to comments at step 1010, and matching product codes, IGA codes, ISA codes, and associated risk points and other relevant data to relevant ads at step 1020. Examples of other relevant data may include, but are not limited to, user-specific information and/or third party data.

Step 1010 is performed by the rule engine 210 by matching the product, service, ISA, IGA, and claim codes, associated risk points, and any other relevant data determined according to the processes above to identify corresponding comments stored in the comment database 250 or among the databases 230, 240, and 260. Besides comments stored among the databases 240, 250, and 260, step 1010 may further include matching the product, service, ISA, IGA, and claim codes, associated risk points, and any other relevant data to third party comment databases. The matched comments may be retrieved by the rule engine 210 for display to the user as part of the process of displaying results at 450.

Among embodiments, it is noted that the matching in step 1010 may be performed in association with any risk points and user-specific information associated with the product, service, ISA, IGA, and claim codes, as determined according to the processes above. In other words, the present invention may determine comments for display based on an analysis of content using various combinations of the codes discussed above, the risk points discussed above, the user-specific information, and any other third party data, as discussed above. As such, it is noted that the present invention collects various metrics (i.e., product, service, issue, and claim codes), risk points, the user-specific information, and any other third party data before the matching at step 1010 occurs. Thus, the matching at step 1010 may be performed with a high degree of flexibility and granularity, so that displayed comments may be selected carefully for relevance and pertinence-even in view of differences between multiple users.

Step 1020 is performed by the rule engine 210 by matching the product, service, ISA, IGA, claim codes, associated risk points, and any other relevant data determined according to the processes above to identify relevant ads stored in the advertisement database 260 or among the databases 230, 240, and 250. Besides comments stored among the databases 240, 250, and 260, step 1020 may further include matching the product, service, ISA, IGA, claim codes, associated risk points, and any other relevant data to third party advertising databases. As such, step 1020 may further include an intermediate step of mapping product, service, ISA, IGA, claim codes, associated risk points, user-specific information, and any other relevant data to tags or one or more classification metrics relied upon by the third party databases to identify, classify, and serve relevant ads. To that end, the rule engine 210 may be further configured to convert between the third party classification metrics and the product, service, ISA, IGA, claim codes, associated risk points, user-specific information, and any other relevant data using tags, a lookup table, or other means, so that relevant ads may be selected for display from the third party databases. The matched relevant ads may be retrieved by the rule engine 210 for display to the user as part of the process of displaying results at 450.

Among embodiments, it is noted that the matching in step 1020 may be performed in association with any risk points, user-specific information, or any other third party data that may be associated with the product, service, ISA, IGA, and claim codes, as determined according to the processes above. In other words, the present invention may determine relevant ads for display based on an analysis of content using various combinations of the codes discussed above, the risk points discussed above, and the user-specific information and/or third party data, as discussed above. As such, it is noted that the present invention collects various metrics (i.e., product, service, issue, and claim codes), risk points, user-specific information, and any other third party data before the matching at step 1020 occurs. Thus, the matching at step 1020, as with at step 1010, may be performed with a high degree of flexibility and granularity, so that relevant ads may be selected carefully for relevance and pertinence-even in view differences between multiple users.

Based on the processes at steps 1010 and 1020 above, it should be appreciated that the comment database 250 may store a plurality of comments related to products and services in general and a plurality of comments related to specific products and services. Additionally, some comments may be tailored for certain user-specific and product-specific situations. For example, users that specify an unemployed status may receive comments in addition to or different than those received by users who specify that they are employed. The advertisement database 260 may include relevant ads that are associated with product codes listed in the product code database 240 alone, or in any combination with other relevant data, such as inherent product risk scores, IGA, and ISA codes, product and issue risk scores, user-specific information, and/or third party data. Thus, along with a detailed display of advertising analysis of ads currently being displayed to a user, the user may also be presented with relevant advertisements for products and services. Among other aspects and embodiments, the ads stored in the advertisement database 260 may be pre-screened by the rule engine 210 for a specific risk rating, thereby allowing users to receive only relevant ads that meet pre-defined risk thresholds.

Table 6 includes an example set of comments which may be retrieved by the rule engine 210 for display to the user. The comment database 250 may include hundreds, thousands, or more comments, and the examples below are not meant to be exhaustive or limiting in content. Some comments may be triggered by a combination code and point score, such that CC(0) may not draw a comment while CC(1) does. As another example, some IGA and ISA codes may draw a comment regardless of any associated points.

TABLE 6

| Product Codes (Points Sum) | Comment |
| --- | --- |
| CC(0) | No comment. |
| CC(1) | This ad is for a "secured" credit card. These products are typically marketed to consumers with blemished or no credit history and often contain higher Annual Percentage Rates and fees than traditional unsecured cards. Based on your excellent self rated credit, you may want to investigate and compare offers for unsecured credit cards. |
| WLP(3) | Be wary of ads for weight loss products that suggest you will lose large amounts of weight quickly. Most testimonials, as well as "before" and "after" pictures, portray dramatic results. Typical results are often much less dramatic. |
| IGA Codes (Points Sum) | |
| $IGA^A(3)$ | When a symbol such as an asterisk or footnote appears next to an ad term, it generally means that there's more important information somewhere in the ad. You should be able to easily find this information by looking for the matching symbol on the same page. This ad may be missing or hiding important information related to the product or service being advertised. |
| $IGA^F(0)$ | This ad uses the term "institute" in its name and web address, which could provide the false impression that it is affiliated with an independent academic or scientific institution. |
| ISA Codes (Points Sum) | |
| $ISA(WLP)^A$ | This ad contains express or implied claims that you will lose a certain amount of weight by using its products, but does not provide a clear statement that actual results may vary nor does it tell you the typical results experienced by users. |
| $ISA(WLP)^B$ | This ad claims the product will result in "clinically proven weight loss" but fails to provide any information about the clinical study or other support for this claim. |
| $ISA(CD)^B$ | The certificate of deposit advertised in this ad has an early withdrawal penalty. The terms of the penalty are highlighted below. |

Figure 11:
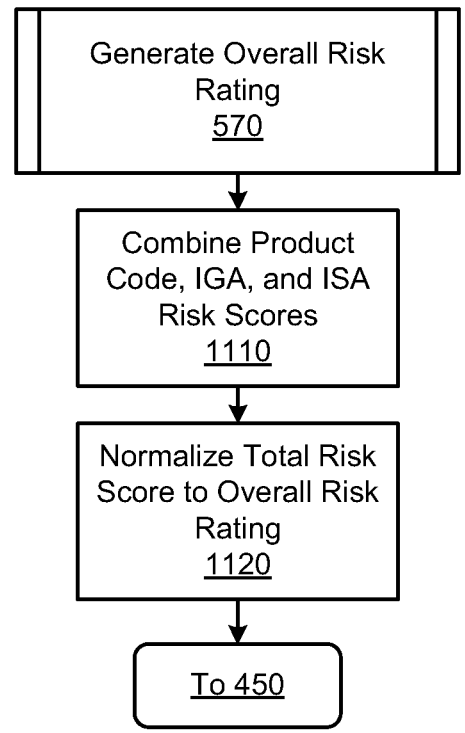
FIG. 11 illustrates an example process flow diagram for generating an overall risk rating.

Turning to FIG. 11, the process of generating an overall risk rating is described in further detail. The process of generating an overall risk rating includes combining product code, IGA, and ISA risk scores at step 1110 and normalizing the total risk score to an overall risk rating at step 1120. That is, the points assigned in the processes above are totaled and normalized to a normalized risk rating of one to five asterisks, for example. Among embodiments, the points may be totaled in one or more ways. For example, the product code points may be summed and weighted higher than the ISA and IGA points. Alternatively, the IGA and/or ISA points may be summed and weighted higher than the product code points. In one embodiment, the administrator is able to configure the weighting of points associated with the product codes, claim codes, ISAs, and IGAs. In this case, the administrator may choose to count points associated with the ISA codes twice, while only counting the points associated with product codes once, as one example. Generally, the points are summed and used to provide a risk rating display that is easy for a user to understand.

Figure 13:
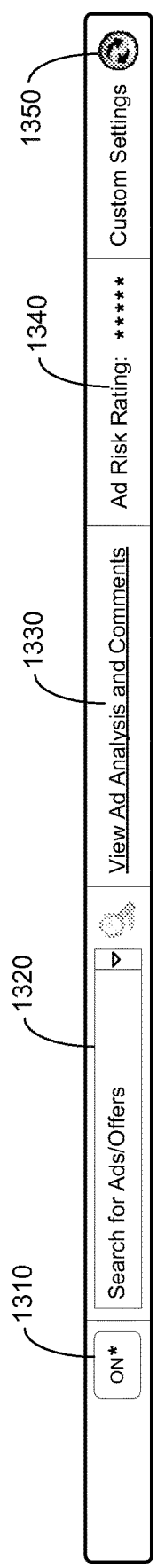
FIG. 13 illustrates an example user console interface in the form of a toolbar according to aspects described herein.

With reference to FIG. 13, an example of a user interface in the form of a web browser toolbar 1300 is described. In the embodiment according to FIG. 13 in which a toolbar is installed at the client computer 110 as a user interface, the toolbar may display a normalized risk score in a risk rating scale 1340. In one embodiment, the web browser toolbar 1300 further includes an on/off button 1310, a de-novo ad search entry field 1320, a link to advertising analysis and comments 1330, and a settings button 1350. Using the settings button 1350, a user may be able to update information such as the setup, account, and user-specific information associated with the user and stored in the user database 230.

It should be noted that the toolbar 1300 is provided only as an example of a user interface to display results. Among embodiments, interfaces may display results as one or more onscreen popup boxes activated and displayed when a user clicks on or hovers over ads or other content to analyze. Moreover, aspects of the present invention may be presented at various times and orders depending upon the user interface. Among user interface embodiments, a user that activates an analysis by clicking or hovering over an ad may receive only a risk rating score in return, and may need to take one or more additional actions to display comments and detailed analysis regarding the ad. Similarly, a user that submits a de-novo search request, as described in further detail below, may receive relevant ads in response to the request and may need to take one or more additional actions to display ratings, comments, or a detailed analysis regarding the ad.

According to execution of processes associated with the toolbar 1300 at the client computer 110, the client computer may be directed to communicate a URL or other identifier of online content being viewed on a display of the client computer 110 to the server 130, as discussed above. Among embodiments, the client computer 110 may communicate the identifier of online content to the server 130 every time a user views a new web page. Alternatively, the client computer 110 may communicate the identifier to the server 130 periodically or only when directed by a user.

After the process 440 of evaluating the online content by the rule engine 210, the toolbar 1300 may receive instructions from the rule engine 210 related to a number of asterisks to display in the risk rating scale 1340. In one embodiment, a high level of risk points relates to a large number of asterisks being displayed in the risk rating scale. For example, to highlight lack of risk, a sum of −1 to 5 risk points may result in the display of 1 asterisk, a sum of 5 to 10 risk points may result in the display of 2 asterisks, a sum of 10 to 15 risk points may result in the display of 3 asterisks, a sum of 15 to 20 risk points may result in the display of 4 asterisks, and a sum of greater than 20 risk points may result in the display of 5 asterisks. Alternatively, a greater sum of risk points may result in a fewer number of asterisks being displayed, to highlight risk. In other embodiments, the risk rating scale 130 may display the overall risk rating using different metrics such as numbers, colors, and/or shapes other than asterisks. For example, the overall risk rating may be displayed in a number from 0 to 100 or with colors from green to red.

The on/off button 1310 of the toolbar 1300 may be used to turn the processes and functions described above on and off by preventing the client computer 110 from sending any indication of the online content currently being viewed on the computer. The on/off functionality may also control whether a user must affirmatively start an analysis process when the user arrives at webpage, or whether the analysis occurs automatically.

The de-novo ad search entry field 1320 may be used to perform a directed advertisement search ("a de-novo search"), regardless of ads displayed in online content. That is, the present invention permits a user of the computer 110 to search for and/or evaluate ads by directly typing words or phrases into the de-novo ad search entry field 1320, regardless of the online content being displayed. For example, a user may enter a search string such as "automobile loans" in the de-novo ad search entry field 1320, and the toolbar 1300 may send the search string back to the server 130 for identification of relevant ads related to the search string. The de-novo ad search entry field 1320 may also be incorporated with a dropdown menu that contains a list of product or service categories corresponding to products and services in the product code database 240 or other third party databases. Ads relevant to "automobile loans" may then be identified from the advertisement database 260 or other third party databases by the rule engine 210 according to the search string, and the identified ads may be retrieved from the advertisement database 260 or other third party database. In this context, the advertisement database 260 may include a cache of advertisements which have been previously evaluated by the rule engine 210, as described above, for retrieval during a de-novo search. The identification of the relevant ads may also be based on any available user-specific information or third party data. The retrieved relevant ads (or links to the ads) may then be sent to the computer 110 for display. When presented with the display of relevant ads, a user of the computer 110 may select one or more of the relevant ads for further analysis and, in response to such a user request, the server 130 may perform further analysis on one or more of the relevant ads according to one or more of the processes 510, 520, 530, 540, 542, 550, 560, and 570 described above.

Thus, among embodiments, one or more of the processes 510, 520, 530, 540, 542, 550, 560, and 570 described above may be performed on any relevant ads retrieved by a de-novo search. In that sense, a de-novo search may comprise the same analysis described above for any content currently being displayed, but for a directed advertisement search by a user. Thus, the de-novo search feature gives users additional flexibility in that products and services may be analyzed at any time, depending upon user-needs.

Figure 14:
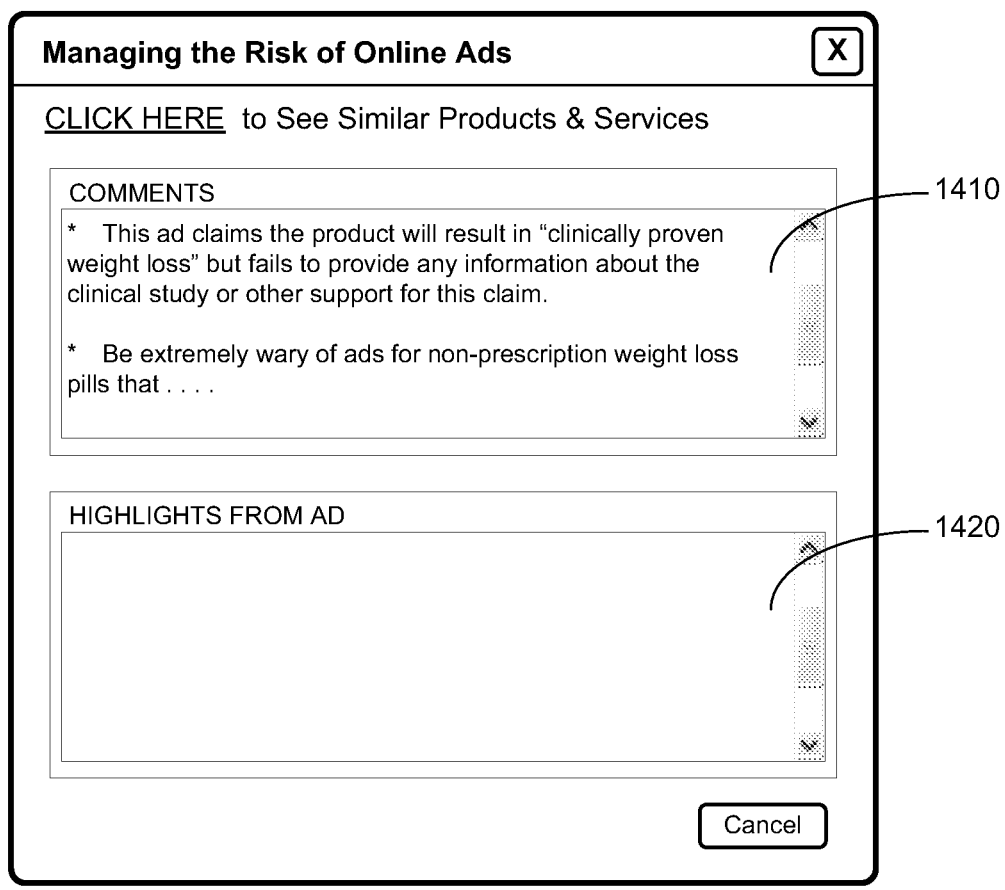
FIG. 14 illustrates an example user interface for displaying comments about and highlights from advertisements.

FIG. 14 illustrates a display box 1400 which may be used to display comments and highlights from ads. In the comments scroll box 1410, comments identified based on product codes, claim codes, ISAs, and IGAs, associated risk scores, and any other relevant data may be displayed. Because the comments may be selected, at least in part, based on user-specific information, the comments may be tailored to a particular user. In the highlights scroll box 1420, highlighted excerpts of content from ads may be displayed. More particularly, words, phrases, or other content identified by the rule engine 210 for highlighting, re-displaying, and enlarging may be displayed in the highlights scroll box 1420. With reference to one example described above, the rule engine 210 may send instructions to the client computer 110 to redisplay the phrase "early withdrawal penalty". Thus, the present invention helps provide users with a simple display of important information which is readily available. The display box 1410 may be displayed when a user selects the link to advertising analysis and comments 1330, for example, or it may be automatically displayed when a certain level of risk is identified for an ad within online content currently being displayed.

Figure 15:
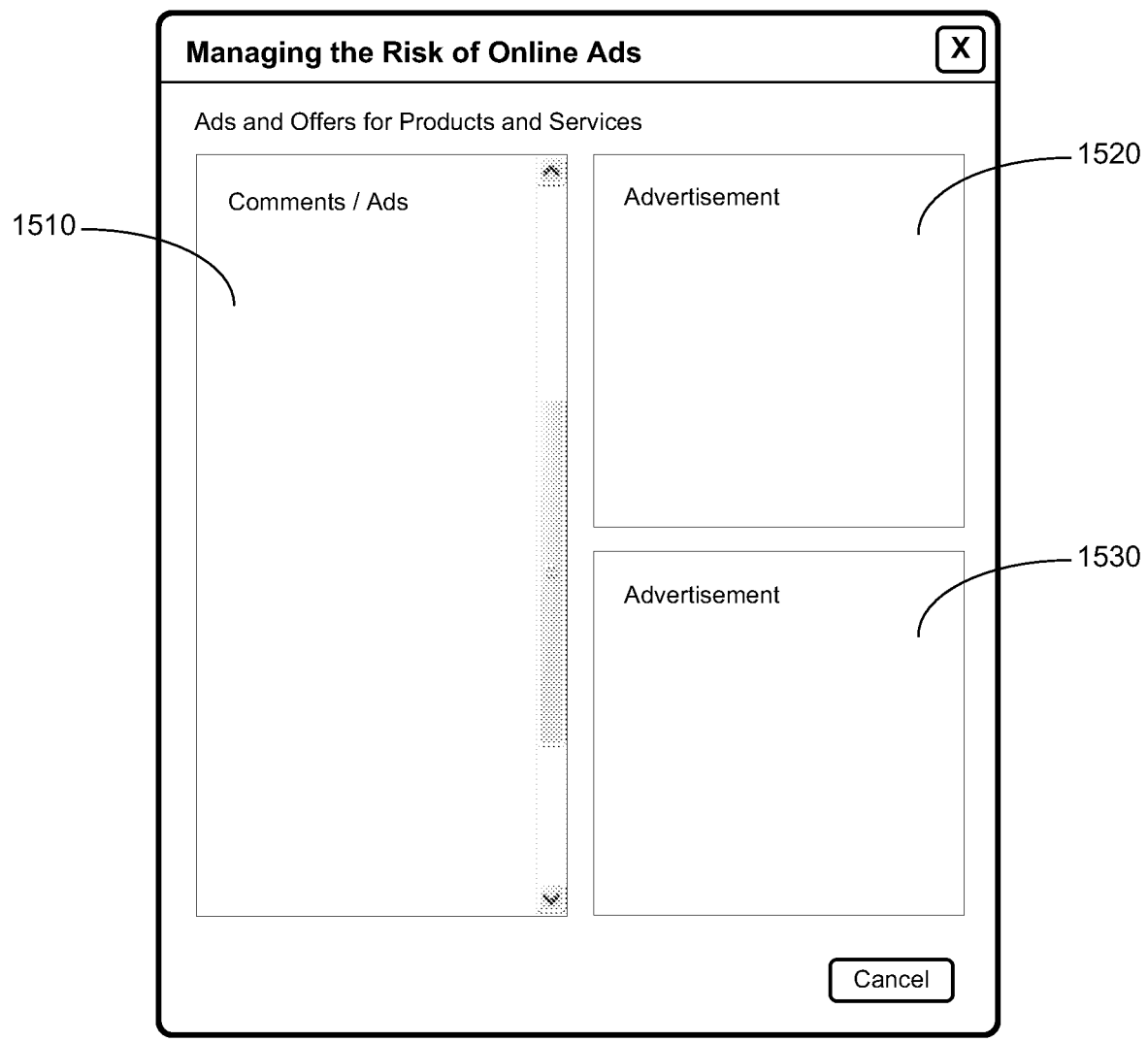
FIG. 15 illustrates an example user interface for displaying relevant advertisements.

FIG. 15 illustrates a display box 1500 which may be used to display relevant ads and related comments. Relevant ads may be displayed in the advertising panels 1520 and 1530. The display box 1500 may open based upon a de-novo search using the de-novo ad search entry field 1320. It is noted that the display boxes 1400 and 1500 are provided as examples only, and other display windows and boxes are within the scope and spirit of the invention.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

What is claimed is:

1. A method comprising:
receiving, by at least one processor remotely located from a client computing device, an indicator identifying first online content retrieved from an Internet location and being displayed in a graphical user interface on a display device associated with the client computing device;
retrieving, by the at least one processor and in response to receiving the indicator, a copy of the first online content from the Internet location or a cache;
identifying, based on the retrieved copy of the first online content, one or more attributes associated with the first online content;
selecting, based on the identified one or more attributes associated with the first online content, one or more criteria from a database;
calculating, by the at least one processor, a first risk score for the first online content, wherein the first risk score is calculated based on application of the selected one or more criteria to the first online content and further comprising calculating a second risk score for a second online content that is accessible via a link embedded within the first online content, the second online content not on display in the graphical user interface;
selecting, from a database coupled to the at least one processor, alternate content for the first online content based on the second risk score; and
transmitting, by the at least one processor, a computer-readable instruction configured to cause the client computing device to display the alternate content in the graphical user interface on the display device in place of the first online content.

2. The method of claim 1, wherein the calculating of the first risk score for the first online content is further based on user-specific information associated with the client computing device.

3. The method of claim 2, wherein the user-specific information includes at least one of an age of a user associated with the client computing device, a credit history of the user, a credit rating of the user, an annual income of the user, an education level of the user, an employment status of the user, a zip code of the user, a mailing address of the user, and a geo-location of the user.

4. The method of claim 1, further comprising:
determining, by the at least one processor and in response to receiving the indicator, that the copy of the first online content has been previously retrieved and stored in a cache, wherein the retrieving the copy of the first online content comprises retrieving the copy of the first online content from the cache.

5. The method of claim 4, wherein the calculating of the first risk score for the first online content comprises retrieving a previously calculated risk score for the first online content from the cache.

6. The method of claim 5, wherein the previously calculated risk score comprises a non-user-specific score, and wherein the calculating of the first risk score for the first online content comprises modifying the non-user-specific score based on user-specific information associated with the client computing device, resulting in a user-specific score for the first online content.

7. The method of claim 1, wherein the selecting of the one or more criteria is based on a word, phrase, or HyperText Markup Language (HTML) tag embedded in the first online content.

8. The method of claim 1, wherein the calculating, by the at least one processor, of the first risk score for the first online content is based on a size, in pixels, of the first online content, and wherein the alternate content is dimensioned to have the size, in pixels, of the first online content.

9. A method comprising:
receiving, by at least one processor remotely located from a client computing device, an indicator identifying online content retrieved from an Internet location and being displayed in a graphical user interface on a display device associated with the client computing device, wherein the online content includes human-readable information, computer-readable information, and style information;
receiving, by the at least one processor, a user identifier associated with the client computing device;
selecting one or more criteria from a database based on the human-readable information, computer-readable information, and style information of the online content;
calculating, by the at least one processor, a risk score for the online content, wherein the risk score is calculated based on application of the selected one or more criteria to the online content and based on the user identifier;
transmitting, by the at least one processor, a computer-readable instruction generated based on the risk score and configured to cause the client computing device to display an alternate content in the graphical user interface on the display device that differs from the online content.

10. The method of claim 9, wherein the calculating of the risk score for the online content comprises retrieving a previously calculated non-user-specific score, and wherein the calculating of the risk score is based on the non-user-specific score and user-specific information associated with the user identifier.

11. The method of claim 10, wherein the user-specific information includes at least one of an age of a user associated with the client computing device, a credit history of the user, a credit rating of the user, an annual income of the user, an education level of the user, an employment status of the user, a zip code of the user, a mailing address of the user, and a geo-location of the user.

12. A method comprising:
receiving, by at least one processor remotely located from a client computing device, an indicator identifying first online content retrieved from an Internet location and being displayed in a graphical user interface on a display device associated with the client computing device;
retrieving, by the at least one processor and in response to receiving the indicator, a copy of the first online content from the Internet location or a cache;
identifying, based on the retrieved copy of the first online content, one or more attributes associated with the first online content;
selecting, based on the identified one or more attributes associated with the first online content, one or more criteria from a database, wherein the selecting of the one or more criteria is based on a word, phrase, or HyperText Markup Language (HTML) tag embedded in the first online content;
calculating, by the at least one processor, a risk score for the first online content, wherein the risk score is calculated based on application of the selected one or more criteria to the first online content;

selecting, from a database coupled to the at least one processor, alternate content for the first online content based on the risk score; and transmitting, by the at least one processor, a computer-readable instruction configured to cause the client computing device to display the alternate content in the graphical user interface on the display device in place of the first online content.

13. A method comprising:

receiving, by at least one processor remotely located from a client computing device, an indicator identifying first online content retrieved from an Internet location and being displayed in a graphical user interface on a display device associated with the client computing device;

retrieving, by the at least one processor and in response to receiving the indicator, a copy of the first online content from the Internet location or a cache;

identifying, based on the retrieved copy of the first online content, one or more attributes associated with the first online content;

selecting, based on the identified one or more attributes associated with the first online content, one or more criteria from a database;

calculating, by the at least one processor, a risk score for the first online content, wherein the risk score is calculated based on application of the selected one or more criteria to the first online content and based on a size, in pixels, of the first online content;

selecting, from a database coupled to the at least one processor, alternate content for the first online content based on the risk score, wherein the alternate content is dimensioned to have the size, in pixels, of the first online content; and transmitting, by the at least one processor, a computer-readable instruction configured to cause the client computing device to display the alternate content in the graphical user interface on the display device in place of the first online content.

\* \* \* \* \*